United States Patent
Ryang

(10) Patent No.: US 7,253,226 B1
(45) Date of Patent: *Aug. 7, 2007

(54) TRACTABLE SILICA SOLS AND NANOCOMPOSITES THEREFROM

(75) Inventor: Hong-Son Ryang, Camarillo, CA (US)

(73) Assignee: APS Laboratory, Camarillo, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 11/202,293

(22) Filed: Aug. 11, 2005

(51) Int. Cl.
*C08K 3/34* (2006.01)

(52) U.S. Cl. ............... 524/492; 524/261; 524/442; 423/335

(58) Field of Classification Search ............ 524/492, 524/261, 442; 423/335
See application file for complete search history.

(56) References Cited

U.S. PATENT DOCUMENTS

| | | | |
|---|---|---|---|
| 4,980,427 A | 12/1990 | Ryang | |
| 5,962,608 A | 10/1999 | Ryang et al. | |
| 6,169,119 B1 | 1/2001 | Ryang et al. | |
| 6,261,687 B1 | 7/2001 | Ryang et al. | |
| 6,500,871 B1 | 12/2002 | Gerardin et al. | |
| 6,579,472 B2 | 6/2003 | Chung et al. | |
| 6,838,486 B2 * | 1/2005 | Ryang | 516/90 |
| 6,955,771 B2 * | 10/2005 | Ryang | 252/389.31 |
| 2001/0056141 A1 | 12/2001 | Schutt | |
| 2003/0024432 A1 | 2/2003 | Chung et al. | |
| 2003/0133890 A1 | 7/2003 | Kauffman et al. | |
| 2003/0144469 A1 | 7/2003 | Kauffman et al. | |

* cited by examiner

*Primary Examiner*—Edward J. Cain
(74) *Attorney, Agent, or Firm*—Amin, Turocy & Calvin, LLP

(57) ABSTRACT

Disclosed are silica sols made by combining at least one hydrolysable silane, at least one organofunctional silane, at least one boron oxide compound, and a liquid, or silica sols made by combining at least one hydrolysable silane, at least one organofunctional silane, at least one acid catalyst, and a liquid to provide an intermediate sol and combining at least one base catalyst with the intermediate sol. Also disclosed are nanocomposites containing the silica sols and at least one of metal nanoparticle, metal-chalcogenide nanoparticle, metal oxide nanoparticle, and metal phosphate nanoparticle. Further disclosed are composites containing a polymer material and at least one of the silica sol and the nanocomposite.

20 Claims, No Drawings

TRACTABLE SILICA SOLS AND NANOCOMPOSITES THEREFROM

FIELD OF THE INVENTION

The subject invention generally relates to silica sols, silica sol hosted guest metal nanoparticles, silica sol hosted guest metal-chalcogenide nanoparticles, silica sol hosted guest metal phosphate nanoparticles, silica sol hosted guest metal oxide nanoparticles, and polymers containing the silica sols, polymers containing the silica sol hosted at least one of guest metal nanoparticles, guest metal-chalcogenide nanoparticles, guest metal phosphate nanoparticles, and guest metal oxide nanoparticles, and related methods.

BACKGROUND

In the last century, synthetic polymers have revolutionized the way in which we live. From synthetic rubber used in tires, structural plastic used in transportation systems, to field responsive polymers used in optical and electrical devices, synthetic polymers are used everywhere. A myriad of products and components for products are made, at least in part, of a polymer material. As the uses for polymers continue to increase, it becomes more and more desirable to improve the properties of polymers.

For example, silica, graphite, carbon black, and clay among many other materials have been incorporated into polymers in attempts to improve the properties of the resultant composites. While improvements have been realized, further improvements are desired.

SUMMARY

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The subject invention provides tractable silica sols. The tractable silica sols can be uniformly incorporated into various polymer systems on a molecular level thereby improving one or more of the polymer properties. The subject invention thus also provides polymer systems with one or more of improved strength, improved corona resistance, improved plasma resistance, improved resistance to organic solvents, improved high temperature stability, improved flame retardancy, improved oxidative stability, refractive index modification, improved fracture properties, improved abrasion resistance, improved liquid permeability, improved gas permeability including improved gas permeability to specific gases, improved (low) hysteresis loss (low rolling resistance), and the like. When used with a translucent polymer or translucent glass, the resulting polymer or glass composition remains clear or translucent.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

The silica sols may be prepared by mixing certain amounts of at least one hydrolysable silane; at least one organofunctional silane; at least one of a boron oxide compound; and a liquid. The silica sols may be prepared by mixing certain amounts of at least one hydrolysable silane; at least one organofunctional silane; at least two catalysts; and a liquid. Dried silica sols can be prepared by removing the liquid from the silica sol.

The nanocomposites contain silica sols, which act as a host and at least one of guest metal nanoparticle such as a noble or non-noble metal nanoparticle, metal-chalcogenide nanoparticle such as noble or non-noble metal-chalcogenide nanoparticle, and metal oxide nanoparticle such as noble or non-noble metal oxide nanoparticle. Although not wishing to be bound by any theory, it is believed that the silica sols act as hosts for individual guest metal atoms and clusters of guest metal atoms. Extensive aggregation and/or precipitation of guest metal is thereby mitigated. The host silica sols also play an important role in improving the compatibility of the resulting nanocomposites with polymer materials. The nanocomposites can be stored in a stable manner in liquid/sol form or in powder/dry form. The nanocomposites are thermally stable, thereby facilitating their use in polymer systems.

The host silica sols contribute to the stability of the nanoparticles; that is, at least partly owing to the presence of the silica sols the nanoparticles are stable over a long period of time, may be stored in a dry state, and are compatible with polymer systems.

The silica sol and the nanocomposite are tractable. That is, the dried silica sol and dried nanocomposite can be stably stored and combined with a liquid to give a substantially clear solution/sol. The dried silica sol and dried nanocomposite may be prepared by removing the liquid phase in the silica sol and nanocomposite at an elevated temperature, to provide a storable, powder form. The silica sol powder and nanocomposite powder may be subsequently recombined with a liquid, to provide a sol. The dried silica sol and dried nanocomposite may be prepared by casting the silica sol and nanocomposite at an elevated temperature and may be in a film form. The silica sol film and nanocomposite film are soluble in a liquid.

A "sol", as the term is used herein, refers to a composition containing a liquid colloidal dispersion containing a liquid phase and a dispersed phase. The liquid phase of the liquid colloidal dispersion may be aqueous and/or organic. The liquid phase may also be a liquid or partially liquid substance to which a silica sol can be added, such as resin monomers. For example, in the case where it is desired to incorporate nanocomposites into a polymer, the liquid phase of the silica sols may be constituted by a polymer monomer in liquid form. A "dried sol" or "dried nanocomposite" results when the liquid phase of a sol is removed.

The term "hydrocarbyl" as used herein includes hydrocarbon as well as substantially hydrocarbon groups. Substantially hydrocarbon describes groups which contain heteroatom substituents which do not alter the predominantly hydrocarbon nature of the group. Examples of hydrocarbyl groups include hydrocarbon substituents, i.e., aliphatic (e.g., alkyl or alkenyl) and substituted aliphatic substituents, alicyclic (e.g., cycloalkyl, cycloalkenyl) substituents, aromatic-, aliphatic- and alicyclic-substituted aromatic substituents, fluorocarbon groups, polysiloxanes, and alkylates. Heteroatoms include, by way of example, fluorine, nitrogen, oxygen, silicon, phosphorus, and sulfur.

A hydrolysable silane includes compounds represented by Formula I:

$$Si(R^1)_4 \quad (I)$$

wherein each $R^1$ is individually at least one hydrolysable group selected from the group consisting of a ketoxime group, an alkoxy group, an alkenoxy group, an acyloxy group, an acetoxy group, a halo group, and an amino group. The hydrolysable group may contain from 1 to about 8 carbon atoms. Examples of hydrolysable silane include ketoximesilanes, alkoxysilanes, alkenoxysilanes, acyloxysilanes, acetoxysilanes, halosilanes, and aminosilanes. For example, when the hydrolysable group is an alkoxy group, examples of the alkoxy group include methoxy, ethoxy, propoxy and butoxy groups, and examples of alkoxysilane include tetramethoxysilane, tetraethoxysilane, tetrapropoxysilane, tetra-n-butoxysilane, dimethoxydiethoxysilane, dimethoxydiproxysilane, partially precondensed tetraethoxysilane (such as Silbond H-5 from Silbond Corp) and the like. Other examples of hydrolysable silane include tetrachlorosilane, tetraacetoxysilane, and tetrakis(dimethylamino)silane.

Organofunctional silanes includes compounds represented by Formula II:

$$(R^2)_{4-c}Si(X^2)_c \quad (II)$$

wherein c is 1 to 3, each $X^2$ is individually a hydrogen, halogen, acetoxy, amino or an alkoxy group containing from 1 to about 4 carbon atoms, and each $R^2$ is individually an organofunctional containing organic group containing from about 1 to about 24 carbon atoms including at least one from the group consisting of heterocyclic, acryloxy, cyano, phosphino, amino, amide, vinyl, epoxy, glycidoxy, aryl, alkyl, a carbon carbon triple bond containing group, mercapto, siloxy, halocarbon such as fluorocarbon, and a carbon carbon double bond containing group. In another embodiment, c is 2 or 3, $X^2$ is individually an alkoxy group containing from 1 to about 2 carbon atoms, and each $R^2$ is individually an organofunctional containing organic group containing from about 2 to about 8 carbon atoms.

The organofunctional containing organic group ($R^2$) of the organosilane is selected so that it is compatible with a polymer in which the resultant silica sols or nanocomposites containing the silica sols may be incorporated. Specific examples of heterocyclic groups include substituted and unsubstituted pyrroles, pyrazoles, imidazoles, pyrrolidines, pyridines, pyrimidines, oxazoles, thiazoles, furans, thiophenes, dithianes, and isocyanurates. Specific examples of acryloxy groups include acryloxy, alkylacryloxy groups such as methacryloxy, and the like. Specific examples of carbon carbon double bond containing groups include alkenyl, cyclopentadienyl, styryl, and phenyl.

Examples of organofunctional silanes include phenyltrimethoxysilane; phenyltriethoxysilane; diphenyldimethoxysilane; diphenyldiethoxysilane; 3-aminopropyltrimethoxysilane; 3-aminopropyltriethoxysilane; N-(3-trimethoxysilylpropyl)pyrrole; N-[3-(triethoxysilyl)propyl]-4,5-dihydroimidazole; beta-trimethoxysilylethyl-2-pyridine; N-phenylaminopropyltrimethoxysilane; 3-(N-styrylmethyl-2-aminoethylamino)propyltrimethoxysilane; methacryloxypropenyltrimethoxysilane; 3-methacryloxypropyltrimethoxysilane; 3-methacryloxypropyltris(methoxyethoxy)silane; 3-cyclopentadienylpropyltriethoxysilane; 7-oct-1-enyltrimethoxysilane, Prosil® 9214 from PCR, Inc. (a carboxy amide silane); 3-glycidoxypropyl-trimethoxysilane; gamma-glycidoxypropylmethyldimethoxysilane; gamma-glycidoxypropylpylpentamethyldisiloxane; gamma-glycidoxypropylmethyldiethoxysilane; gamma-glycidoxypropyldimethylethoxysilane; (gamma-glycidoxypropyl)-bis-(trimethylsiloxy)methylsilane; vinylmethyldiethoxysilane; vinylmethyldimethoxysilane; methylaminopropyltrimethoxysilane; n-octyltriethoxysilane; n-octyltrimethoxysilane; hexyltriethoxysilane; isobutyltrimethoxysilane; 3-ureidopropyltriethoxysilane; 3-isocyanatepropyltriethoxysilane; N-phenyl-3-aminopropyltrimethoxysilane; 3-triethoxysilyl-N-(1,3-dimethyl-butyliden) propylamine; N-2(aminoethyl)-3-aminopropyltriethoxysilane; N-2(aminoethyl)-3-aminopropyltrimethoxysilane; N-2(aminoethyl)-3-aminopropylmethyldimethoxysilane; 3-acryloxypropyltrimethoxysilane; methacryloxypropylmethyldiethoxysilane; methacryloxypropylmethyldimethoxysilane; glycidoxypropylmethyldiethoxysilane; 2-(3,4 epoxycyclohexyl)-ethyltrimethoxysilane; vinyltrimethoxysilane; vinyltriethoxysilane; amonophenyltrimethoxysilane; triethoxysilane; p-chloromethyl)phenyltri-n-propoxysilane; diphenylsilanediol; 2-(3,4-epoxycyclohexyl) ethyltrimethoxysilane; epoxyhexyltriethoxysilane; tris(3-trimethoxysilylpropyl)isocyanurate; dococentyltrimethoxysilane; 3-mercaptopropyltriethoxysilane; 1,4-bis(trimethoxysilylethyl)benzene; phenylsilane; trimethoxysilyl-1,3-dithiane; n-trimethoxysilylpropylcarbamoylcaprolactam; 2-(diphenylphosphine)ethyltriethoxysilane, 3-cyanopropyltrimethoxysilane, diethylphosphatoethyltriethoxysilane, phenyltrichlorosilane, phenyltriacetoxysilane, octyltrichlorosilane, hexyltrichlorosilane, phenylbis(dimethylamino)chlorosilane and the like.

Hydrolysable silanes and organofunctional silanes are commercially available from a number of sources including under the trade designation Prosil® from Clariant and from ShinEtsu among others.

Boron oxide compounds contain at least boron and oxygen atoms. Boron oxide compounds include boric acid $(B(OH)_3)$, alkoxy boron compounds (or boron alkoxides), hydrocarbyl boric acids, hydrocarbyl hydroxy boron alkoxides, and hydroxy boron alkoxides. In one embodiment, boron oxide compounds can be represented by Formula III:

$$B(OH)_d(OR)_{3-d} \quad (III)$$

wherein each R is independently a hydrocarbyl group containing from 1 to about 8 carbon atoms, and d is from 0 to about 3. In another embodiment, each R is independently a hydrocarbyl group containing from 1 to about 4 carbon atoms, and d is from 1 to about 2. In yet another embodiment, boron oxide compounds can be represented by Formula IV:

$$B(OH)_e(OR)_f(R^3)_{3-(e+f)} \quad (IV)$$

wherein each R is independently a hydrocarbyl group containing from 1 to about 8 carbon atoms, each $R^3$ is independently a hydrocarbyl group containing from 1 to about 24 carbon atoms, e is from 0 to about 3, and f is from 0 to about 3. In still yet another embodiment, each R is independently a hydrocarbyl group containing from 1 to about 4 carbon atoms and each $R^3$ is independently a hydrocarbyl group containing from 1 to about 10 carbon atoms.

Specific examples of boron oxide compounds include boric acid, boron tri-n-butoxide, boron tri-sec-butoxide, boron tri-t-butoxide, boron triisopropoxide, boron tri-n-propoxide, boron trimethoxide, boron triethoxide, hydroxy boron diisopropoxide, hydroxy boron diethoxide, hydroxy boron dimethoxide, hydroxy boron dibutoxide, dihydroxy boron isopropoxide, dihydroxy boron ethoxide, dihydroxy boron methoxide, dihydroxy boron butoxide, phenylboronic acid, 3-acetylphenylboronic acid, 4-acetylphenylboronic acid, 5-chlorothiophene-2-boronic acid, 1,4-phenylenebis (boronic acid), (2-carboxyphenyl)boronic acid, (3-carboxyphenyl)boronic acid; (4-carboxyphenyl)boronic acid, (3,4-methylenedioxyphenyl)boronic acid, 4-methylthio) phenylboronic acid, naphthalene-1-boronic acid, naphthalene-2-boronic acid, 8-quinolineboronic acid, benzothiophene-2-boronic acid, (2-acetylaminophenyl)boronic acid, (3-acetylaminophenyl)boronic acid, 4-acetylaminophenyl)boronic acid, (3-methoxycarbonylphenyl)boronic acid, (4-methoxycarbonylphenyl)boronic acid, (4-methyl-1-naphthalene)boronic acid, and the like.

Boric oxide and boric acids are commercially available. For example, boric acids are available from Aldrich, Acros Organics, and Ryscor Science, Inc. Boron alkoxides and hydroxy boron alkoxides can be synthesized by the dehydration of mixtures of alcohol with boric oxide or boric acid. For example, boric acid and ethanol can be used to synthesize boron triethoxide.

A catalyst is a compound that facilitates the reaction amongst hydrolysable silane and organofunctinal silane, and optional boron oxide compound to provide the silica sols. Catalysts may be used in effective amounts, for example, about 0.0001 to about 0.1 mole percent to achieve the desired results. The catalysts used in the preparation of silica sols include the organic and inorganic bases, the organic and inorganic acids, metal salts, metal alkoxides, and metal chelates.

Examples of organic and inorganic base catalysts include alkali metal and alkaline earth metal hydroxides such as sodium hydroxide, potassium hydroxide, and lithium hydroxide, and sodium carbonate, sodium acetate, sodium methylate, sodium hydrogencarbonate, isopropyl amine, sodium phenoxide, potassium carbonate, and ammonia, a compound that decomposes to form ammonia, such as ammonium hydroxide, organic quaternary ammonium hydroxides such as tetramethylammonium hydroxide and tetraethylammonium hydroxide, organic amines such as trialkyl amines (e.g., triethyl amine, pyridine, diazabicyclo [2,2,2,]octane, trialkanolamines such as triethanol amine and diamines, and other organic compounds, such as urea.

Examples of inorganic acid catalyst include mineral acids such as HF, HCl, HBr, HI, $H_2SO_4$, $HNO_3$, $H_3PO_4$, $HBF_4$, and the like. Examples of organic acid include aliphatic or aromatic carboxylic acids such as acetic acid, adipic acid, ascorbic acid, aspartic acid, azelaic acid, adenosinephosphoric acid, benzoic acid, formic acid, valeric acid, citric acid, glycolic acid, glutamic acid, cinnamic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, benzenesulfinic acid, benzenesulfonic acid, malonic acid and maleic acid, methyl sulfonic acid, phenylsulfonic acid, toluenesulfonic acid, trifluoroacetic acid, trifluoromethane sulfonic acid, tartaric acid, succinic acid, citric acid trifluoromethylsulfonic acid, and their esters, sulfonated organic polymers or resins, and the like.

Examples of metal salt catalysts include fluoride, chloride, bromide, iodide, acetate, oxalate, stearate, naphthenate, nitrate, sulfate, carbonate, oxide, and hydroxide salts of metals such as potassium, sodium, calcium, magnesium, aluminum, zinc, tin, cobalt, manganese, chromium, nickel, copper, litium, and zirconium.

Metal chelate compounds may be used as a catalyst. Examples of the metal chelate compounds include organic chelate compounds of Al, Ti, Mn, Fe, Co, Ni, Cu, Zn, Ge, In, Sn, Zr, and Hf. Specific examples of the metal chelate catalyst include aluminum bis-ethylacetoacetate monoacetylacetonate, aluminum diacetylacetonate ethyl acetoacetate, aluminum monoacetylacetonate bis-propyl acetoacetate, aluminum monoacetylacetonate bisbutyl acetoacetate, aluminum monoacetylacetonate bishexyl acetoacetate, aluminum monoethyl acetoacetate bispropyl acetoacetonate, aluminum monoethyl acetoacetate bisbutyl acetoacetonate, aluminum monoethylacetoacetate bis-hexyl acetoacetonate, aluminum monoethylacetoacetate bisnonylacetoacetonate, aluminum dibutoxide monoacetoacetate, aluminum dipropoxide monoacetoacetate, aluminum butoxide monoethylacetoacetate, aluminum-s-butoxide bis(ethyl acetoacetate), aluminum di-s-butoxide ethylacetoacetate, aluminum-9-octadecenyl acetoacetate diisopropoxide, titanium allylacetoacetate triisopropoxide, titanium di-n-butoxide (bis-2,4-pentanedionate), titanium diisopropoxide (bis-2,4-pentanedionate), titanium diisopropoxide bis (tetramethylheptanedionate), titanium diisopropoxide bis (ethyl acetoacetate), titanium methacryloxyethylacetoacetate triisopropoxide, titanium oxide bis(pentanedionate), zirconium allylacetoacetate triisopropoxide, zirconium di-n-butoxide (bis-2,4-pentanedionate), zirconium diisopropoxide (bis-2,4-pentanedionate), zirconium diisopropoxide bis(tetramethylheptanedionate), zirconium diisopropoxide bis(ethylacetoacetate), zirconium methacrylicoxyethylacetoacetate triisopropoxide, zirconium butoxide (acetylacetate) (bisethylacetoacetate), and iron acetylacetonate.

In one embodiment, the silica sols are prepared by combining the hydrolysable silane, the organofunctional silane, and the boron oxide compound in any suitable order with a liquid such as water and/or an organic solvent. In this connection, the hydrolysable silane, the organofunctional silane, and the boron oxide compound may be simultaneously combined; the hydrolysable silane and the organofunctional silane may be initially combined, followed by addition of the boron oxide compound; the hydrolysable silane and the boron oxide compound may be initially combined, followed by addition of the organofunctional silane; or the boron oxide compound and the organofunctional silane may be initially combined, followed by addition of the hydrolysable silane. The presence of boron oxide compound in the reaction solution may allow one to maintain a clear solution throughout the reaction. One or more of any suitable acid catalyst, base catalyst, or metal salt catalyst in the amount of about less than about 5% by weight may be optionally employed to facilitate the formation of the silica sols.

In one embodiment, the silica sols are prepared by mixing the hydrolysable silane, the organofunctional silane, an acid catalyst, in any suitable order with a liquid such as water and/or an organic solvent to provide intermediate sols; and mixing a liquid such as water and/or an organic solvent and the base catalyst with the intermediate sol to provide the silica sol. In another embodiment, the intermediate sol is provided by using a weak acid catalyst and the silica sol is provided by using a strong base catalyst. In yet another embodiment, the intermediate sol is provided by using an acid catalyst and the silica sol is provided by using a base catalyst at more than 1 of a molar ratio of base/acid. Optionally, the boron oxide compound may be added to the solution at any time. The presence of boron oxide compound in the reaction solution may allow one to maintain a clear solution throughout the reaction.

In one embodiment, the silica sols are prepared by mixing the hydrolysable silane, the organofunctional silane, an acid catalyst, in any suitable order with a liquid such as water and/or an organic solvent to provide intermediate sols; removing the liquid from the intermediate sols; and mixing a liquid such as water and/or an organic solvent and the base catalyst with the intermediate sol to provide the silica sol. When a volatile acid catalyst is employed, the volatile acid catalyst is removed at an elevated temperature. Optionally, the boron oxide compound may be added to the solution at any time. The presence of boron oxide compound in the reaction solution may allow one to maintain a clear solution throughout the reaction.

A catalytically effective amount of the catalyst is used to provide the intermediate sol and silica sol. In one embodiment, the catalyst is used in the amount of from about 0.001% by weight to about 5% by weight of the reaction solution. In another embodiment, the catalyst is used in the amount of from about 0.03% by weight to about 3% by weight of the reaction solution. In yet another embodiment, the catalyst is used in the amount of from about 0.05% by weight to about 1% by weight of the reaction solution.

After the intermediate sol is prepared by mixing the hydrolysable silane, the organofunctional silane, the acid catalyst with the liquid, the liquid is removed from the intermediate sols to provide a dried intermediate sol. In one embodiment, the intermediate sol is subject to an evaporation technique, with optional heating, to remove the liquids present. A vacuum may be employed to facilitate removal of the liquids. The resultant dry silica sol may be in a powder-like form.

The dried intermediate sol is combined with and dissolved in a liquid such as water and/or an organic solvent at a temperature suitable to facilitate dissolving and mixed with the base catalyst to provide the silica sol. In one embodiment, the temperature while dissolving the dried intermediate sol is maintained from about 20° C. to about 100° C. In another embodiment, the temperature while dissolving the dried intermediate sol is maintained from about 30° C. to about 90° C.

The liquid is at least one of water and an organic solvent. In one embodiment, the hydrolysable silane, organofunctional silane, and boron oxide compound are combined in a mixture of water and at least one organic solvent. In another embodiment, the hydrolysable silane, organofunctional silane, and boron oxide compound are combined in an organic solvent, followed by addition of water. Regardless of the liquid protocol, a certain minimum amount of water is desirably provided to facilitate formation of stable sols.

The following general equations illustrate exemplary preparation methods of silica sols (although it is understood that not every possible permutation is listed):

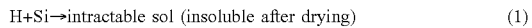    (1)

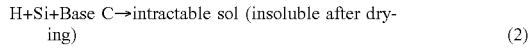    (2)

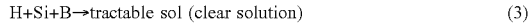    (3)

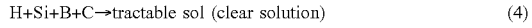    (4)

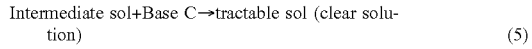    (5)

wherein H=hydrolysable silane, Si=organofunctional silane, C=catalyst, and B=boric oxide compound.

The minimum amount of water, in moles, can be determined based on the empirical equation of the sol formation. More specifically, in one embodiment, representing the reaction as follows:

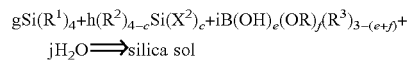

where $R^1$, $R^2$, $R^3$, X, c, e, and f are as defined above. In one embodiment, the minimum amount of water, and thus j, is determined using the following equation: $(4g+hc+if)/2$. That is, in the above reaction, $j \gtrsim (4g+hc+if)/2$. In another embodiment, $j > (4g+hc+if)/2$. This minimum amount of water is referred to as a sol facilitating amount of water. The water may be added when combining the hydrolysable silane, organofunctional silane, and boron oxide compound with an organic solvent, or when combining the hydrolysable silane, organofunctional silane, and boron oxide compound with a polymer, or just after combining the hydrolysable silane, organofunctional silane, and boron oxide compound with a polymer.

In some instances, water for hydrolysis is liberated by the boron compound, especially when a boron hydroxide compound is employed (when e in the reaction scheme is at least 1). In these instances, the water created lowers or eliminates the water requirement of $jH_2O$ in the reaction scheme above. Thus, in another embodiment, the minimum amount of water, and thus j, is determined using the following equation: $[(4g+hc+if)]-(ie)$. That is, in the above reaction, $j \gtrsim [(4g+hc+if)/2]-(ie)$. A relatively low amount of water, and in some instances no or virtually no water can be employed when a boron hydroxide compound is employed. The presence of at least one boron hydroxide group can decrease the amount of water needed to promote the sol formation. The boron hydroxide group can provide water by reacting with any number of species including solvents such as alcohol solvents.

In another embodiment, representing the reaction as follows:

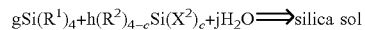

where $R^1$, $R^2$, X, and c are as defined above. In one embodiment, the minimum amount of water, and thus j, is determined using the following equation: $(4g+hc)/2$. That is, in the above reaction, $j \gtrsim (4g+hc)/2$. In another embodiment, $j > (4g+hc)/2$. This minimum amount of water is referred to as a sol facilitating amount of water.

For example, in another embodiment, the reaction scheme may be represented by:

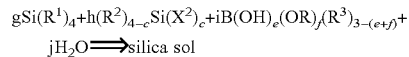

where $R^1$, $R^2$, $R^3$, X, c, and f are as defined above, e is at least 1, and g, h, i, and j are the number of moles of each component.

In yet another embodiment, the reaction scheme may be represented by:

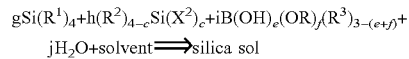

where $R^1$, $R^2$, $R^3$, X, c, and f are as defined above, e is at least 1, and g, h, i, and j are the number of moles of each component. Preferably, the solvent in this reaction scheme contains at least some alcohol solvent.

In still another embodiment, the reaction scheme may be represented by:

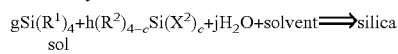
sol where $R^1$, $R^2$, X, and c are as defined above. Preferably, the solvent in this reaction scheme contains at least some alcohol solvent.

Certain relative amounts of the hydrolysable silane, organofunctional silane, and optional boron oxide compound are combined in order to facilitate the formation of stable silica sols.

In one embodiment, from about 10 mole % to about 80 mole % of the hydrolysable silane and 5 mole % to about 70 mole % of the organofunctional silane. Optionally, from about 1 mole % to about 80 mole % of the boron oxide compound may be added to the solution. In another embodiment, from about 13 mole % to about 75 mole % of the hydrolysable silane and from 7 mole % to about 65 mole % of the organofunctional silane. Optionally, from about 3 mole % to about 75 mole % of the boron oxide compound may be added to the solution. In yet another embodiment, from about 15 mole % to about 70 mole % of the hydrolysable silane and from 10 mole % to about 60 mole % of the organofunctional silane. Optionally, from about 5 mole % to about 70 mole % of the boron oxide compound may be added to the solution.

In one embodiment, from about 10% to about 80% by weight of the hydrolysable silane and from about 10% to about 60% by weight of the organofunctional silane. Optionally, from about 0.5% to about 80% by weight of the boron oxide compound may be added to the solution. In another embodiment, from about 15% to about 75% by weight of the hydrolysable silane and from about 13% to about 55% by weight of the organofunctional silane. Optionally, from about 0.7% to about 75% by weight of the boron oxide compound may be added to the solution. In yet another embodiment, from about 20% to about 70% by weight of the hydrolysable silane and from about 15% to about 50% by weight of the organofunctional silane. Optionally, from about 1% to about 70% by weight of the boron oxide compound may be added to the solution.

One or more of any suitable organic solvent may be employed to combine the hydrolysable silane, organofunctional silane, and optional boron oxide compound to provide the silica sol. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like. The identity of the organic solvent is not critical to the subject invention.

The hydrolysable silane, organofunctional silane, optional boron oxide compound, and optional catalyst are combined with water and/or an organic solvent at a temperature suitable to facilitate mixing and/or the formation of the silica sols. In one embodiment, the temperature while combining components is maintained from about 15° C. to about 100° C. In another embodiment, the temperature while combining components is maintained from about 20° C. to about 90° C.

When a boron oxide compound is added to the solution to prepare the silica sol, the boron oxide compound can be removed once the silica sol is prepared. A silica sol without boron oxide compound also can be used as a host for metal nanoparticles. If desired, the boron oxide can be removed from the silica sol anytime after making the silica sol. The boron oxide compound can be removed by various methods. For example, boric acid can be removed by treating the solution with methanol to form volatile methylborate.

The silica sols may be stored in a wet or dry state. In the wet state, the hydrolysable silane, organofunctional silane, boron oxide compound, optional catalyst, and organic solvent and/or water are simply stored in a container. In another embodiment, the silica sols made by mixing the hydrolysable silane, the organofunctional silane, the acid catalyst, and a liquid to provide an intermediate sol, removing the liquid from the intermediate sol, and mixing a liquid and the base catalyst with the intermediate sol are simply stored in a container.

When storage in a wet state is employed, delivery and movement of the silica sols is facilitated by minimizing the amount of liquid. In one embodiment, the silica sols may be stored in a stable wet state for at least about 6 months. In another embodiment, the silica sols may be stored in a stable wet state for at least about 12 months.

When storing in a dry state, the silica sol in the wet state are subject to an evaporation technique, with optional heating, to remove the liquids present. A vacuum may be employed. The resultant dry silica sol is in a stable powder-like form. In one embodiment, the silica sol may be stored in a stable dry state for at least about 6 months. In another embodiment, the silica sols may be stored in a stable dry state for at least about 9 months.

In one embodiment, the dried silica sol contains from about 10% to about 80% by weight of the hydrolysable silane and from about 10% to about 60% by weight of the organofunctional silane. Optionally, the dried silica sols also contain from about 0.5% to about 80% by weight of the boron oxide compound. In another embodiment, the dried metal sols contain from about 15% to about 75% by weight of the hydrolysable silane and from about 13% to about 55% by weight of the organofunctional silane. Optionally, the dried silica sols also contain from about 0.7% to about 75% by weight of the boron oxide compound. In yet another embodiment, the dried metal sols contain from about 20% to about 70% by weight of the hydrolysable silane and from about 15% to about 50% by weight of the organofunctional silane. Optionally, the dried silica sols also contain from about 1% to about 70% by weight of the boron oxide compound.

In one embodiment, the dried silica sol contains less than about 0.5% by weight water. In another embodiment, the dried silica sol contains less than about 0.1% by weight water. In yet another embodiment, the dried silica sol contains less than about 0.05% by weight water.

When storing in a dry state, the dried silica sol can be heated up to about 200° C. for about 2 hours without degradation. Also when storing in a dry state, the dried silica sol can be stored in at least a semi-airtight container, although this is not necessary. Due to the stability of the silica sols, an advantage is that they may be stored in the open air without degradation. This is because it is believed that the silica sol resists water uptake and/or is stable to oxidation. It is another alternative to store the dried sol in an airtight container or in a vacuum pack/state.

At least one of guest metal nanoparticle, guest metal-chalcogenide nanoparticle, metal phosphate nanoparticle, guest metal oxide nanoparticle, and precursors of these guest nanoparticles may be combined with the silica sol, or combined with one or more of the hydrolysable silane, organofunctional silane, optional boron oxide compound, optional catalyst, water and/or an organic solvent during formation of the silica sol in any suitable order to provide the nanocomposites containing the host silica sol and at least one of guest metal nanoparticle, guest metal-chalcogenide nanoparticle, metal phosphate nanoparticle, guest metal oxide nanoparticle, and precursors of these guest nanoparticles.

For example, at least one of guest metal nanoparticle, guest metal-chalcogenide nanoparticle, metal phosphate nanoparticle, guest metal oxide nanoparticle, and precursors of these guest nanoparticles may be simultaneously combined with the hydrolysable silane, the organofunctional silane, and the boron oxide compound; the hydrolysable silane, the organofunctional silane, and the liquid are initially combined, followed by adding at least one of guest metal nanoparticle, guest metal-chalcogenide nanoparticle, metal phosphate nanoparticle, guest metal oxide nanoparticle, and precursors of these guest nanoparticles, and further followed by adding the boron oxide compound; the hydrolysable silane, the organofunctional silane, the boron oxide compound, and the liquid are initially combined, followed by adding at least one of guest metal nanoparticle, guest metal-chalcogenide nanoparticle, metal phosphate nanoparticle, guest metal oxide nanoparticle, and precursors of these guest nanoparticles; the hydrolysable silane, at least one of guest metal nanoparticle, guest metal-chalcogenide nanoparticle, metal phosphate nanoparticle, guest metal oxide nanoparticle, and precursors of these guest nanoparticles and the liquid are initially combined, followed by adding the organofunctional silane; the hydrolysable silane, at least one of guest metal nanoparticle, guest metal-chalcogenide nanoparticle, metal phosphate nanoparticle, guest metal oxide nanoparticle, and precursors of these guest nanoparticles are initially combined, followed by adding boron oxide compound, and further followed by adding the organofunctional silane. Optionally, a catalyst may be added to the solution at any time. The presence of a catalyst in the reaction solution may allow one to maintain a clear solution throughout the reaction.

For further example, at least one of guest metal nanoparticle, guest metal-chalcogenide nanoparticle, metal phosphate nanoparticle, guest metal oxide nanoparticle, and precursors of these guest nanoparticles may be simultaneously combined with the hydrolysable silane, the organofunctional silane, the liquid, and the acid catalyst to provide a intermediate sol, removing the liquid from the intermediate sols, dissolving the dried intermediate sols in a liquid, and mixing the intermediate sol solution with the base catalyst to provide the silica sol; the hydrolysable silane, the organofunctional silane, and the liquid are initially combined, followed by adding at least one of guest metal nanoparticle, guest metal-chalcogenide nanoparticle, metal phosphate nanoparticle, guest metal oxide nanoparticle, and precursors of these guest nanoparticles, and further followed by adding the acid catalyst to provide a intermediate sol, removing the liquid from the intermediate sols, dissolving the dried intermediate sols in a liquid, and mixing the intermediate sol solution with the base catalyst to provide the silica sol the hydrolysable silane, the organofunctional silane, the acid catalyst, and the liquid are initially combined, followed by adding at least one of guest metal nanoparticle, guest metal-chalcogenide nanoparticle, metal phosphate nanoparticle, guest metal oxide nanoparticle, and precursors of these guest nanoparticles to provide a intermediate sol, removing the liquid from the intermediate sols, dissolving the dried intermediate sols in a liquid, and mixing the intermediate sol solution with the base catalyst to provide the silica sol; the hydrolysable silane, at least one of guest metal nanoparticle, guest metal-chalcogenide nanoparticle, metal phosphate nanoparticle, guest metal oxide nanoparticle, and precursors of these guest nanoparticles, the acid catalyst, and the liquid are initially combined, followed by adding the organofunctional silane to provide a intermediate sol, removing the liquid from the intermediate sols, dissolving the dried intermediate sols in a liquid, and mixing the intermediate sol solution with the base catalyst to provide the silica sol; mixing the hydrolysable silane, the organofunctional silane, the liquid, and the acid catalyst to provide a intermediate sol, adding at least one of guest metal nanoparticle, guest metal-chalcogenide nanoparticle, metal phosphate nanoparticle, guest metal oxide nanoparticle, and precursors of these guest nanoparticles to the intermediate sol, removing the liquid from the intermediate sols, dissolving the dried intermediate sols in a liquid, and mixing the intermediate sol solution with the base catalyst to provide the silica sol; mixing the hydrolysable silane, the organofunctional silane, the liquid, and the acid catalyst to provide a intermediate sol, removing the liquid from the intermediate sols, dissolving the dried intermediate sols in a liquid, adding at least one of guest metal nanoparticle, guest metal-chalcogenide nanoparticle, metal phosphate nanoparticle, guest metal oxide nanoparticle, and precursors of these guest nanoparticles to the intermediate sol, and mixing the intermediate sol solution with the base catalyst to provide the silica sol; mixing the hydrolysable silane, the organofunctional silane, the liquid, and the acid catalyst to provide a intermediate sol, dissolving the dried intermediate sols in a liquid, mixing the intermediate sol solution with the base catalyst to provide the silica sol, and adding at least one of guest metal nanoparticle, guest metal-chalcogenide nanoparticle, metal phosphate nanoparticle, guest metal oxide nanoparticle, and precursors of these guest nanoparticles to the silica sol. Optionally, the boron oxide compound may be added to the solution at any time. The presence of boron oxide compound in the reaction solution may allow one to maintain a clear solution throughout the reaction. Optionally, a catalyst may be added to the solution at any time. The presence of a catalyst in the reaction solution may allow one to maintain a clear solution throughout the reaction.

The use of chelating compounds can effectively help control the particle size of guest metal nanoparticle, the guest metal-chalcogenide nanoparticle, guest metal phosphate nanoparticle, and/or guest metal oxide nanoparticle. Chelating compounds include silanes having a chelating group such as mercapto, amino, cyano, amide, phosphino, or heterocyclic group and non-silane chelating compounds such as alkylthiols, arylthiols, alkylamines, arylamines, alkylcarboxylic acids, arylcarboxylic acids, arylphosphines, alkylphosphines, and the like. Chelating compounds can be added during the preparation of host silica sols or host-guest silica sols.

Generally speaking, the metal nanoparticle precursors fall into two groups; namely, 1) noble metal ions and 2) zero valence noble and non-noble metals. Although more fully described elsewhere, examples of noble metal ions include gold hydroxide and silver acetate. Noble metal ions can be reduced to form metal nanoparticles by heat, UV exposure, and reducing agents (such as phenylsilane, hydrogen gas, etc.). Examples of zero valence noble and non-noble metals include metal carbonyls and metal olefins. Zero valence noble and non-noble metals can release ligands and form metal clusters/nanoparticles by application of heat, for example. Non-noble metal ions can form metal chalcogenide nanoparticles after incorporation into a host sol and treated with a chalcogenizing agent. Specific examples of non-noble metal ions include cadmium acetate and lead acetate.

While metal nanoparticle precursors are converted to metal nanoparticles, which can be then converted to metal-chalcogenide nanoparticles, metal phosphate nanoparticles, or metal oxide nanoparticles (generally when the metal nanoparticle precursors are zero valence noble and non-noble metals); metal nanoparticle precursors may be directly converted to metal-chalcogenide nanoparticles, metal phosphate nanoparticles, or metal oxide nanoparticles (generally when the metal nanoparticle precursors are noble metal ions).

Generally speaking, high level examples of making the metal chalcogenide nanoparticles include one or more of the following three general and specific reaction routes.

cobalt hydroxide, zinc hydroxide, nickel hydroxide, cadmium hydroxide, iron acetate, cobalt acetate, zinc acetate, chromium acetate hydroxide, manganese acetate, molybdenum acetate, nickel acetate, lead acetate, cadmium acetate, iron chloride, cobalt chloride, zinc chloride, vanadium chloride, chromium chloride, manganese chloride, molybdenum chloride, nickel chloride, lead chloride, cadmium chloride, niobium chloride, tungsten chloride, iron acetylacetonate, cobalt acetylacetonate, zinc acetylacetonate, vanadyl acetylacetonate, chromium acetylacetonate, manganese acetylacetonate, molybdenum acetylacetonate, nickel acetylacetonate, lead acetylacetonate, cadmium acetylacetonate, niobium acetylacetonate, iron citrate, cobalt citrate, zinc citrate, nickel citrate, lead citrate, iron nitrate, cobalt nitrate, zinc nitrate, chromium nitrate, manganese nitrate, nickel nitrate, lead nitrate, cadmium nitrate, iron ethoxide, cobalt ethoxide, zinc ethoxide, vanadium ethoxide, chromium ethoxide, manganese ethoxide, molybdenum ethoxide, nickel ethoxide, lead ethoxide, cadmium ethoxide, niobium ethoxide, tungsten ethoxide, cerium methoxyethoxide, erbium acetate, europium acetoacetate, gallium ethoxide, hafnium n-butoxide, indium methoxyethoxide, strontium acetate, tantalum n-butoxide, yttrium acetate, tin acetoacetate, lithium isopropoxide, calcium methoxyethoxide, mag-

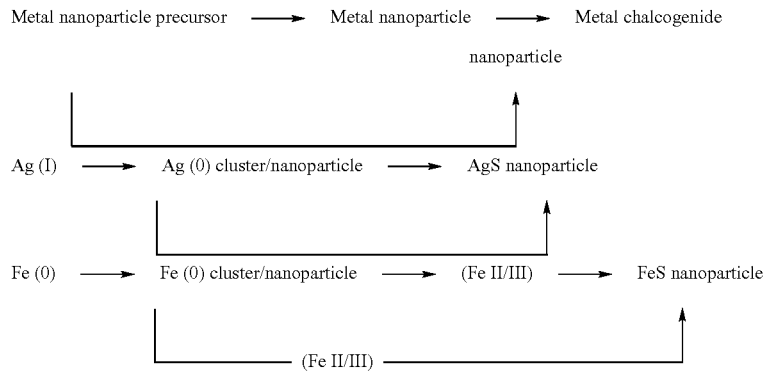

Guest metal nanoparticle precursors may include zero valence metal (e.g., metal carbonyls, metal olefins) and noble metal ions (e.g., metal alkoxide, metal oxides, metal hydroxides, metal carboxylates, metal nitrates, metal halides, metal cyanides, chelated metals. Examples of metals include gold, silver, platinum, palladium, ruthenium, copper, rhodium, technetium, osmium, iron, cobalt, zinc, vanadium, chromium, manganese, rhenium, nickel, iridium, and tungsten. Examples of guest metal nanoparticle precursors include gold hydroxide, gold acetate, gold chloride, silver acetate, silver acetylacetonate, silver citrate, silver lactate, silver nitrate, platinum acetylacetonate, platinum chloride, palladium acetylacetonate, palladium acetate, palladium hydroxide, ruthenium acetylacetonate, copper acetate, copper ethoxide, $Fe(CO)_5$, $Fe_2(CO)_9$, $CO_2(CO)_8$, $ZnX(CO)Y$, $V(CO)_6$, $Cr(CO)_6$, $Mn_2(CO)_{10}$, $Re_2(CO)_{10}$, $Ru_3(CO)_{12}$, $Mo(CO)_6$, $Ni(CO)_4$, $OS(CO)_5$, $Os_3(CO)_{12}$, $Ir_4(CO)_{12}$, $W(CO)_6$, $Tc_2(CO)_{10}$, $Ru(CO)_5$, $Rh(CO)_{12}$, $Pd(CO)_4$, $Pt(CO)_4$, platinum-1,3-divinyl-1,1,3,3,-tetramethyldisiloxane, and the like.

Examples for metal-chalcogenide nanoparticle precursors, metal phosphate nanoparticle precursors, and metal oxide nanoparticle precursor include, in addition to the metal nanoparticle precursors listed above, iron hydroxide, nesium methoxyethoxide, tinisopropoxide, aluminum s-butoxide, titanium isopropoxide, vanadium triisopropoxide oxide, and zirconium n-butoxide.

Metal-chalcogenide nanoparticles may include noble or non-noble metal-chalcogenide nanoparticles. Examples of metal-chalcogenide nanoparticles may contain AuS, AuSe, AuTe, AgS, AgSe, AgTe, PtS, PtSe, PtTe, PdS, PdSe, PdTe, IrS, IrSe, IrTe, ReS, ReSe, ReTe, HgS, HgSe, HgTe, RuS, RuSe, RuTe, RhS, RhSe, RhTe, CuS, CuSe, CuTe, OsS, OsSe, OsTe, FeS, FeSe, FeTe, CoS, CoSe, CoTe, VS, VSe, VTe, CrS, CrSe, CrTe, MnS, MnSe, MnTe, MoS, MoSe, MoTe, NiS, NiSe, NiTe, ZnS, ZnSe, ZnTe, CdS, CdSe, CdTe, NbS, NbSe, NbTe, TcS, TcSe, TcTe, WS, WSe, WTe, SbS, SbSe, SbTe, BaS, BaSe, BaTe, EuS, EuSe, EuTe, GdS, GdSe, GdTe, GaS, GaSe, GsTe, InS, InSe, InTe, LaS, LaSe, LaTe, PbS, PbSe, PbTe, NdS, NdSe, NdTe, PrS, PrSe, PrTe, SmS, SmSe, SmTe, SrS, TaS, TaSe, TaTe, SrSe, SrTe, TaS, TaSe, TaTe, SnS, SnSen SnTe, YbS, YbSe, YbTe, YS, YSe, and YTe.

Metal oxide nanoparticles may include noble or non-noble metal oxide nanoparticles. The plurality of metal oxide nanoparticles has a chemical structure of the form $M_xO_y$, where x and y are integers. Examples of the metal element of M include a metal element selected from the IIIA, IIIB, IVA, IVB, VA, VB, VIA, VIIA, VII and IIB groups in the periodic table. Specific examples of metal oxide nanoparticles include $Ac_2O_3$, $Ag_2O$, $AgO$, $Al_2O_3$, $As_2O_3$, $As_2O_5$, $Au_2O_3$, $BaO$, $BaO_2$, $BeO$, $Bi_2O_3$, $CaO$, $CdO$, $CeO_2$, $CoO$, $CO_3O_4$, $Cr_2O_3$, $CrO_3$, $Cs_2O$, $Cs_2O_2$, $Cs_2O_3$, $Cu_2O$, $CuO$, $EuO$, $FeO$, $Fe_3O_4$, $Fe_2O_3$, $Ga_2O3$, $GdO$, $GeO_2$, $HfO_2$, $HgO$, $In_2O_3$, $Ir_2O_3$, $IrO_2$, $KO_2$, $La_2O_3$, $Li_2O$, $MgO$, $MnO$, $Mn_3O_4$, $Mn_2O_3$, $MnO_2$, $MoO_2$, $MoO_3$, $Na_2O$, $Na_2O_2$, $NbO$, $NbO_2$, $Nb_2O_5$, $Nd_2O_3$, $NiO$, $NpO_2$, $OsO_2$, $OsO_4$, $PbO$, $Pb_3O_4$, $PbO_2$, $PdO$, $PoO_2$, $Pr_2O_3$, $PtO_2$, $PuO$, $Pu_2O_3$, $PuO_2$, $Rb_2O$, $ReO_2$, $ReO_2$, $ReO_3$, $Rh_2O_3$, $RuO_2$, $Sb_2O_3$, $Sc_2O_3$, $SeO_2$, $Sm_2O_3$, $SnO$, $SnO_2$, $SrO$, $SrO_2$, $Ta_2O_5$, $TeO_2$, $TiO_2$, $Ti_2O_3$, $UO_2$, $VO$, $V_2O_3$, $VO_2$, $V_2O_5$, $WO_3$, $Y_2O_3$, $Yb_2O_3$, $ZnO$, and $ZrO_2$.

Metal phosphate nanoparticles generally comprise a phosphate and either a monoatomic metal cation or a polyatomic metal cation. A "phosphate", as the term is used herein, refers to orthophosphates, pyrophosphates, metaphosphates and polyphosphates. The metal component of the metal phosphate nanoparticles can include Group IIA metals, Group IIIA metals, Group IVB metals, and Group VIII metals. As used herein, the Group IIA metals comprise the alkaline earth metals of beryllium, magnesium, calcium, strontium, and barium; the Group IIIA metals comprise aluminum, gallium, indium, and thallium; the Group IVB metals comprise titanium, zirconium and hafnium; and the Group VII metals comprise iron, cobalt, nickel, ruthenium, rhodium, palladium, osmium, iridium and platinum.

The metal phosphate nanoparticles can be represented stoichiometrically by the formula, $M^{z+}_{(n+2)/z}P_nO_{3n+1}$, wherein M is a metal atom, P is phosphorous, O is oxygen, and n and z are an integer number of one or greater. Specific examples of metal phosphate nanoparticles include lithium phosphate ($LiPO_3$, $Li_3PO_4$), sodium phosphate ($NaPO_3$, $Na_3PO_4$, $Na_4P_2O_7$), potassium phosphate ($K_3PO_4$), magnesium phosphate ($Mg(PO_3)_2$, $Mg_3(PO_4)_2$, $Mg_2P_2O_7$), calcium phosphate ($Ca_3(PO_4)_2$, $Ca(PO_3)_2$, $Ca_2P_2O_7$), barium phosphate ($Ba(PO_3)_2$, $Ba_3(PO_4)_2$, $BaPO_3$, $Ba_2P_2O_7$), cadmium phosphate ($Cd_3(PO_4)_2$, $Cd_2P_2O_7$), chromium phosphate ($Cr_4(P_2O_7)_3$), manganese phosphate ($Mn_3(PO_4)_2$, $Mn_2P_2O_7$), molybdenum phosphate ($Mo(PO_3)_4$), platinum phosphate ($PtP_2O_7$), silver phosphate ($AgPO_3$, $Ag_3PO_4$, $Ag_4P_2O_7$), aluminum phosphate ($AlPO_4$, $Al(PO_3)_3$), thallium phosphate ($Tl_3PO_4$), tin phosphate ($Sn_3(PO_4)_2$, $Sn(PO_3)_2$, $Sn_2P_2O_7$), lead phosphate ($Pb_2(PO_4)_2$, $Zn_2P_2O_7$), zinc phosphate ($Zn_3(PO_4)_2$, $Zn_2P_2O_7$), bismuth phosphate ($BiPO_4$), cobalt phosphate ($CO_3(PO_4)_2$), lanthanum phosphate ($LaPO_4$), cerium phosphate ($CePO_4$, $Ce(PO_3)_3$), praseodymium phosphate ($PrPO_4$), neodymium phosphate ($NdPO_4$), samarium phosphate ($SmPO_4$), yttrium phosphate ($YPO_4$), erbium phosphate ($ErPO_4$), thorium phosphate ($Th(PO_3)_4$), nickel phosphate $Ni_3(PO_4)_2$), titanium phosphate ($TiPO_4$), chromium phosphate ($CrPO_4$), iron phosphate ($FePO_4$, $Fe_3(PO_4)_2$), $Zn_2Fe(PO_4)_2$, $Zn_2Ni(PO_4)_2$, $Zn_2Mn(PO_4)_2$, $Mn_2Fe(PO_4)_2$, $Zn_2Ca(PO_4)_2$, $Li_3FePO_4$, and $Li_3V_2(PO_4)_3$.

In one embodiment, from about 10% to about 80% by weight of at least one hydrolysable silane, from about 10% to about 60% by weight of at least one organofunctional silane, from about 0.5% to about 80% by weight of at least one boron oxide compound and an optional catalyst, or effective amounts of at least two catalysts and an optional boron oxide compound, a liquid, and from about 0.001% to about 80% by weight of at least one of guest metal nanoparticle, guest metal-chalcogenide nanoparticle, metal phosphate nanoparticle, guest metal oxide nanoparticle, and precursors of these guest nanoparticles are combined to form the host-guest silica sol nanocomposite. In another embodiment, from about 15% to about 75% by weight of at least one hydrolysable silane, from about 13% to about 55% by weight of at least one organofunctional silane, from about 0.7% to about 75% by weight of at least one boron oxide compound and an optional catalyst, or effective amounts of at least two catalysts and an optional boron oxide compound, a liquid, and from about 0.005% to about 80% by weight of at least one of guest metal nanoparticle, guest metal-chalcogenide nanoparticle, metal phosphate nanoparticle, guest metal oxide nanoparticle, and precursors of these guest nanoparticles are combined to form the host-guest silica sol nanocomposite. In yet another embodiment, from about 20% to about 70% by weight of at least one hydrolysable silane, from about 15% to about 50% by weight of at least one organofunctional silane, from about 1% to about 70% by weight of at least one boron oxide compound and an optional catalyst, or effective amounts of at least two catalysts and an optional boron oxide compound, a liquid, and from about 0.01% to about 80% by weight of at least one of guest metal nanoparticle, guest metal-chalcogenide nanoparticle, metal phosphate nanoparticle, guest metal oxide nanoparticle, and precursors of these guest nanoparticles are combined to form the host-guest silica sol nanocomposite.

In one embodiment, from about 20% to about 99.999% by weight of the silica sols and from about 0.001% to about 80% by weight of at least one of the guest metal nanoparticle, guest metal-chalcogenide nanoparticle, metal phosphate nanoparticle, guest metal oxide nanoparticle, and precursors of these guest nanoparticles are combined to form the host-guest silica sol nanocomposite. In another embodiment, from about 50% to about 99.995% by weight of the silica sols and from about 0.005% to about 50% by weight of at least one of the guest metal nanoparticle, guest metal-chalcogenide nanoparticle, metal phosphate nanoparticle, guest metal oxide nanoparticle, and precursors of these guest nanoparticles are combined to form the host-guest silica sol nanocomposite. In yet another embodiment, from about 80% to about 99.99% by weight of the silica sols and from about 0.01% to about 20% by weight of at least one of the guest metal nanoparticle, guest metal-chalcogenide nanoparticle, metal phosphate nanoparticle, guest metal oxide nanoparticle, and precursors of these guest nanoparticles are combined to form the host-guest silica sol nanocomposite.

The nanocomposites containing the host silica sols and guest metal oxide nanoparticle can be prepared by oxidizing the host guest silica sols containing the host silica sols and at least one of guest metal oxide nanoparticle precursors and guest metal nanoparticles. The guest metal oxide nanoparticle precursors and/or guest metal nanoparticles in the host-guest silica sols may be oxidized to provide the nanocomposites containing the host silica sols and guest metal oxide nanoparticles.

The host-guest silica sols may be treated with an oxidizing agent at ambient temperature or at elevated temperatures to provide the metal oxide nanocomposites. Examples of oxidation agents include an oxygen containing gas such as oxygen and air, ozone, sodium or potassium permanganate, sodium or potassium bichromate, and manganese peroxide.

The oxidation treatment may be carried out either in solution form or in powder form of host-guest silica sols. In one embodiment, the host-guest silica sols in a wet state may be subject to oxidation treatment. The host-guest silica sols may be dissolved in a liquid. The liquid may be water and/or an organic solvent. In one embodiment, the host-guest silica sols are dissolved in an organic solvent. In another embodiment, the host-guest silica sols are dissolved in a mixture of water and at least one organic solvent. In another embodiment, the host-guest silica sols are dissolved in water, followed by addition of an organic solvent. In yet another embodiment, the host-guest silica sols are dissolved in an organic solvent, followed by addition of water.

One or more of any suitable organic solvent may be employed to dissolve the host-guest silica sols for the oxidation. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like. The identity of the organic solvent is not critical to the subject invention.

The host-guest silica sols may be dissolved for the oxidation in water and/or an organic solvent at a temperature suitable to facilitate dissolving. In one embodiment, the temperature while dissolving the host-guest silica sols is maintained from about 20° C. to about 100° C. In another embodiment, the temperature while dissolving the host-guest silica sols is maintained from about 30° C. to about 90° C.

The host-guest silica sols solution may be treated with an oxidation agent. In one embodiment, oxidation agent gas may be bubbled through the solutions. In another embodiment, the host-guest silica sols solution may be combined with oxidation agent solution.

The oxidation treatment may be carried out in powder form of host-guest silica sol. The host-guest silica sols powder may be exposed to an oxidation agent. In one embodiment, the host-guest silica sol powder may be exposed to an oxidation agent gas.

The oxidation treatment may be carried out at a temperature suitable to facilitate oxidation. In one embodiment, the oxidation treatment is carried out at an ambient temperature. In another embodiment, the temperature during oxidation is maintained from about 10° C. to about 100° C. In another embodiment, the temperature during oxidation is maintained from about 15° C. to about 90° C.

The nanocomposites containing the host silica sols and guest metal-chalcogenide nanoparticle can be prepared by chalcogenizing the host-guest silica sols containing the host silica sols and at least one of the guest metal-chalcogenide precursors, guest metal nanoparticles, and guest metal oxide nanoparticies. The guest metal-chalcogenide precursors, guest metal nanoparticles, and guest metal oxide nanoparticles in the host-guest silica sols may be chalcogenized to provide the nanocomposites containing the host silica sols and guest metal-chalcogenide nanoparticles.

The host-guest silica sols may be treated with a chalcogenizing agent at ambient temperature or at elevated temperatures to provide the metal-chalcogenide nanocomposites. Chalcogenizing agents include sulfurization agents, selenization agents and tellurization agents. Hydrogen chalcogenides such as $H_2S$, $H_2Se$, and $H_2Te$ may be used. In addition, other chalcogenizing agents may be used which include labile metal-chalcogenides, elemental chalcogens, thioamide (e.g., methylthioamide), thioacetamide (e.g., methoxythioacetamide), thiourea, bis-(trimethylsilylsulfide), carbon disulfide, and the like. Labile metal-chalcogenides include $Al_2S_3$, $Al_2Se_3$, $Al_2Te_3$, $Na_2S$, $Na_2Se$, $Na_2Te$, CaS, CaSe, CaTe, FeS, FeSe, FeTe, $TiS_2$, $TiSe_2$, $TiTe_2$, $ZrS_2$, $ZrSe_2$, $ZrTe_2$, $B_2S_3$, $B_2Se_3$, and $B_2Te_3$. Elemental chalcogens include S, Se, and Te.

The chalcogenization treatment may be carried out either in solution form or in powder form of host-guest silica sols. In one embodiment, the host-guest silica sols in a wet state may be subject to chalcogenization treatment. The host-guest silica sols may be dissolved in a liquid. The liquid may be water and/or an organic solvent. In one embodiment, the host-guest silica sols are dissolved in an organic solvent. In another embodiment, the host-guest silica sols are dissolved in a mixture of water and at least one organic solvent. In another embodiment, the host-guest silica sols are dissolved in water, followed by addition of an organic solvent. In yet another embodiment, the host-guest silica sols are dissolved in an organic solvent, followed by addition of water.

One or more of any suitable organic solvent may be employed to dissolve the host-guest silica sols for the chalcogenization. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like. The identity of the organic solvent is not critical to the subject invention.

The host-guest silica sols may be dissolved for the chalcogenization in water and/or an organic solvent at a temperature suitable to facilitate dissolving. In one embodiment, the temperature while dissolving the host-guest silica sols is maintained from about 20° C. to about 150° C. In another embodiment, the temperature while dissolving the host-guest silica sols is maintained from about 30° C. to about 100° C.

The host-guest silica sols solution may be treated with a chalcogenizing agent. In one embodiment, chalcogenizing agent gas may be bubbled through the solutions. In another embodiment, the host-guest silica sols solution may be combined with chalcogenizing agent solution.

The chalcogenization treatment may be carried out in powder form of host-guest silica sol. The host-guest silica sols powder may be exposed to a chalcogenizing agent. In one embodiment, the host-guest silica sol powder may be exposed to a chalcogenizing agent gas.

The chalcogenization treatment may be carried out at a temperature suitable to facilitate chalcogenization. In one embodiment, the chalcogenization treatment is carried out at an ambient temperature. In another embodiment, the temperature during chalcogenization is maintained from about 10° C. to about 150° C. In another embodiment, the temperature during chalcogenization is maintained from about 15° C. to about 100° C.

The nanocomposites containing the host silica sols and guest metal phosphate nanoparticles can be prepared by phosphatizing the host-guest silica sols containing the host silica sols and at least one of guest metal phosphate precursors, guest metal nanoparticles, and guest metal oxide nanoparticles. The guest metal phosphate precursors, guest metal nanoparticles, and guest metal oxide nanoparticles in the host-guest silica sols may be phosphatized to provide the nanocomposites containing the host silica sols and guest metal phosphate nanoparticles.

The host-guest silica sols may be treated with a phosphatizing agent at ambient temperature or at elevated temperatures to provide the metal phosphate nanocomposites. Generally the phosphatizing agents are alkyl phosphates, polyphosphoric acid esters and phosphate ions that may or may not contain additional metal salts. Examples of phosphatizing agents include methylphosphate, ethylphosphate, polyphosphoric acid methylester and an acidic aqueous solution of phosphate ion.

The phosphatization treatment may be carried out either in solution form or in powder form of host-guest silica sols. In one embodiment, the host-guest silica sols in a wet state may be subject to phosphatization treatment. The host-guest silica sols may be dissolved in a liquid. The liquid may be water and/or an organic solvent. In one embodiment, the host-guest silica sols are dissolved in an organic solvent. In another embodiment, the host-guest silica sols are dissolved in a mixture of water and at least one organic solvent. In another embodiment, the host-guest silica sols are dissolved in water, followed by addition of an organic solvent. In yet another embodiment, the host-guest silica sols are dissolved in an organic solvent, followed by addition of water.

One or more of any suitable organic solvent may be employed to dissolve the host-guest silica sols for the phosphatization. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like. The identity of the organic solvent is not critical to the subject invention.

The host-guest silica sols may be dissolved for the phosphatization in water and/or an organic solvent at a temperature suitable to facilitate dissolving. In one embodiment, the temperature while dissolving the host-guest silica sols is maintained from about 20° C. to about 100° C. In another embodiment, the temperature while dissolving the host-guest silica sols is maintained from about 30° C. to about 90° C.

The host-guest silica sols solution may be treated with a phosphatizing agent. In another embodiment, the host-guest silica sols solution may be combined with phosphatization agent solution. The phosphatization treatment may be carried out in powder form of host-guest silica sol. The host-guest silica sols powder may be exposed to a phosphatization agent. In one embodiment, the host-guest silica sol powder may be exposed to a phosphatization agent gas.

The phosphatization treatment may be carried out at a temperature suitable to facilitate phosphatization. In one embodiment, the phosphatization treatment is carried out at an ambient temperature. In another embodiment, the temperature during phosphatization is maintained from about 10° C. to about 100° C. In another embodiment, the temperature during phosphatization is maintained from about 15° C. to about 90° C.

The nanocomposite containing the host silica sol and at least one of guest metal oxide nanoparticles and gust metal phosphate nanoparticles can be prepared by treating the silica sol solution with metal oxide sol and/or metal phosphate sol. The metal oxide sol and/or metal phosphate sol in sol solution form or dry powder form can be combined with the silica sol to form the host-guest silica sol nanocomposite. Exemplary metal oxide sol for use in the invention are illustrated in U.S. patent application Ser. No. 10/337,624, filed on Jan. 7, 2003, entitled "METAL OXIDE SOLS AS NANOSCALE ADDITIVES FOR POLYMERS", which is hereby incorporated by reference. Exemplary metal phosphate sol for use in the invention are illustrated in U.S. patent application Ser. No. 11/070,626, filed on Mar. 2, 2005, titled "METAL PHOSPHATE SOLS, METAL NANOPARTICLES, METAL-CHALCOGENIDE NANOPARTICLES, AND NANOCOMPOSITES MADE THEREFROM", which is hereby incorporated by reference.

The metal oxide sols can be prepared by combining certain relative amounts of a metal oxide compound, organosilane, and a boron oxide compound with a liquid such as water and/or an organic solvent. Metal oxide compounds include a metal and at least one alkoxide group or carboxylate group. Metal oxides include metal methoxides, metal ethoxides, metal isopropoxides, metal propoxides, metal butoxides, metal ethylhexoxides, metal (triethanolaminato) isopropoxides, chelated metal alkoxides such as metal bis (2,4-pentanedionate)diisopropoxides, metal bis(ethyl acetoacetato)diisopropoxides, and metal trifluoroacetylacetonates. Metal oxides also include at least one of transition metal alkoxides, post-transition metal alkoxides, alkali metal alkoxides, and alkaline earth metal alkoxides. The metal of the metal oxide compounds include at least one transition metal and/or alkaline earth metal and combinations thereof. Transition metals include Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. Post-transition metals include Al, Ga, In, Tl, Ge, Sn, Pb, Sb, Bi, and Po. Alkali metals include Li, Na, K, Rb and Cs. Alkaline earth metals include Be, Mg, Ca, Sr and Ba. In one embodiment, the metal of the metal oxide compound is at least one of aluminum, titanium and zirconium. Metal oxide compounds are commercially available or can be made from precursor compounds such as transition metal halides, alkaline earth metal halides, post-transition metal halides, alkali metal halides, transition metal carboxylates, alkaline earth metal carboxylates, post-transition metal carboxylates, alkali metal carboxylates, transition metal nitrates, alkaline earth metal nitrates, post-transition metal nitrates, and alkali metal nitrates.

Specific examples of metal oxide compounds include aluminum triethoxide, aluminum isopropoxide, aluminum sec-butoxide, aluminum tri-t-butoxide, magnesium trifluoroacetylacetonate, magnesium methoxide, magnesium ethoxide, titanium methoxide, titanium ethoxide, titanium isopropoxide, titanium propoxide, titanium butoxide, titanium ethylhexoxide, titanium (triethanolaminato)isopropoxide, titanium bis(ethyl acetoacetato)diisopropoxide, titanium bis(2,4-pentanedionate)diisopropoxide, zirconium ethoxide, zirconium isopropoxide, zirconium propoxide, zirconium sec-butoxide, zirconium t-butoxide, aluminum di-s- butoxide ethylacetonate, calcium methoxyethoxide, calcium methoxide, magnesium methoxyethoxide, copper ethoxide, copper methoxyethoxyethoxide, antimony butoxide, bismuth pentoxide, chromium isopropoxide, tin ethoxide, zinc methoxyethoxide, titanium n-nonyloxide, vanadium tri-n-propoxide oxide, vanadium triisobutoxide oxide, iron ethoxide, tungsten ethoxide, samarium isopropoxide, lanthanum methoxyethoxide, and combinations of two or more of the above compounds.

Examples of organosilanes for preparing the metal oxide sol include tetramethoxysilane, tetraethoxysilane, tetrapropoxysilane, tetra-n-butoxysilane, and the like, and phenyltrimethoxysilane; phenyltriethoxysilane; diphenyldimethoxysilane; diphenyldiethoxysilane; 3-aminopropyltrimethoxysilane; 3-aminopropyltriethoxysilane; N-(3-trimethoxysilylpropyl)pyrrole; N-[3-(triethoxysilyl)propyl]-4,5-dihydroimidazole; beta-trimethoxysilylethyl-2-pyridine; N-phenylaminopropyltrimethoxysilane; 3-(N-styrylmethyl-2-aminoethylamino)propyltrimethoxysilane; methacryloxy-propenyltrimethoxysilane; 3-methacryloxypropyltrimethoxysilane; 3-methacryloxypropyltris(methoxyethoxy)silane; 3-cyclopentadienylpropyltriethoxysilane; 7-oct-1-enyltrimethoxysilane, Prosil® 9214 from PCR, Inc. (a carboxy amide silane); 3-glycidoxypropyl-trimethoxysilane; gamma-glycidoxypropylmethyldimethoxysilane; gamma-glycidoxypropylpylpentamethyldisiloxane; gamma-glycidoxypropylmethyldiethoxysilane; gamma-glycidoxypropyldimethylethoxysilane; (gamma-glycidoxypropyl)-bis-(trimethylsiloxy)methylsilane; vinylmethyldiethoxysilane; vinylmethyldimethoxysilane; methylaminopropyltrimethoxysilane; n-octyltriethoxysilane; n-octyltrimethoxysilane; hexyltriethoxysilane; isobutyltrimethoxysilane; 3-ureidopropyltriethoxysilane; 3-isocyanatepropyltriethoxysilane; N-phenyl-3-aminopropyltrimethoxysilane; 3-triethoxysilyl-N-(1,3-dimethyl-butyliden) propylamine; N-2(aminoethyl)-3-aminopropyltriethoxysilane; N-2(aminoethyl)-3-aminopropyltrimethoxysilane; N-2(aminoethyl)-3-aminopropylmethyldimethoxysilane; 3-acryloxypropyltrimethoxysilane; methacryloxypropylmethyldiethoxysilane; methacryloxypropylmethyldimethoxysilane; glycidoxypropylmethyldiethoxysilane; 2-(3,4 epoxycyclohexyl)-ethyltrimethoxysilane; vinyltrimethoxysilane; vinyltriethoxysilane; amonophenyltrimethoxysilane; triethoxysilane; p-chloromethyl)phenyltri-n-propoxysilane; diphenylsilanediol; 2-(3,4-epoxycyclohexyl)ethyltrimethoxysilane; epoxyhexyltriethoxysilane; tris(3-trimethoxysilylpropyl)isocyanurate; dococentyltrimethoxysilane; 3-mercaptopropyltriethoxysilane; 1,4-bis(trimethoxysilyiethyl)benzene; phenylsilane; trimethoxysilyl-1,3-dithiane; n-trimethoxysilyipropylcarbamoylcaprolactam; 2-(diphenylphosphine)ethyltriethoxysilane, 3-cyanopropyltrimethoxysilane, diethylphosphatoethyltriethoxysilane, and the like. These organosilanes are commercially available from a number of sources including under the trade designation Prosil® from Clariant and from ShinEtsu among others, or they may be prepared from organosilane precursor compounds such as corresponding halosilanes, such as vinyltrichlorosilane.

The metal oxide, organosilane, and boron oxide compound are combined in a liquid to form the metal oxide sol. The liquid is at least one of water and an organic solvent. In one embodiment, the metal oxide, organosilane, and boron oxide compound are combined in a mixture of water and at least one organic solvent. In another embodiment, the metal oxide, organosilane, and boron oxide compound are combined in water, followed by addition of an organic solvent. In yet another embodiment, the metal oxide, organosilane, and boron oxide compound are combined in an organic solvent, followed by addition of water. Regardless of the liquid protocol, a certain minimum amount of water is desirably provided to facilitate formation of stable sols.

To form the metal oxide sols, in one embodiment, from about 10 mole % to about 45 mole % of the metal oxide, from about 25 mole % to about 80 mole % of the organosilane, and from about 15 mole % to about 50 mole % of the boron oxide compound are combined. In another embodiment, from about 15 mole % to about 40 mole % of the metal oxide, from about 30 mole % to about 75 mole % of the organosilane, and from about 20 mole % to about 45 mole % of the boron oxide compound are combined to form the metal oxide sols. In yet another embodiment, from about 20 mole % to about 35 mole % of the metal oxide, from about 35 mole % to about 70 mole % of the organosilane, and from about 25 mole % to about 40 mole % of the boron oxide compound are combined to form the metal oxide sols.

Certain relative amounts of the silica sol and the metal oxide sol are combined in order to facilitate the formation of the nanocomposite containing the host silica sol and guest metal oxide nanoparticles. In one embodiment, from about 20% to about 99.999% by weight of the silica sols and from about 0.001% to about 80% by weight of the metal oxide sol are combined to form the nanocomposite containing the host silica sol and guest metal oxide nanoparticles. In another embodiment, from about 50% to about 99.995% by weight of the silica sols and from about 0.005% to about 50% by weight of the metal oxide sol are combined to form the nanocomposite containing the host silica sol and guest metal oxide nanoparticles. In yet another embodiment, from about 80% to about 99.99% by weight of the silica sols and from about 0.01% to about 20% by weight of the metal oxide sol are combined to form the nanocomposite containing the host silica sol and guest metal oxide nanoparticles.

The metal phosphate sol can be prepared by combining certain relative amounts of the metal oxide compound, a phosphate precursor, and the organosilane with a liquid such as water and/or an organic solvent.

Phosphate precursors include alkylphosphates, polyphosphoric acid, and polyphosphoric acid esters. Examples of alkylphosphates may include methylphosphate, ethylphosphate, propylphosphate, butylphosphate, pentylphosphate, hexylphosphate, dimethylphosphate, diethylphosphate, dipropylphosphate, dibutylphosphate dipentylphosphate, methylethylphosphate, ethylbutylphosphate, ethylpropylphosphate, trimethylphosphate, triethylphosphate, tripropylphosphate, tributylphosphate, tripentylphosphate, ethyl dimethylphosphate, and ethyl dibutylphosphate. Polyphosphoric acid esters include esters of di-, tri-, tetra-, penta-phosphoric acid with a monohydric alcohol and/or polyhydric alcohol. Examples of polyphosphoric acid esters include polyphosphoric acid methyl ester, polyphosphoric acid ethyl ester, polyphosphoric acid propyl ester, polyphosphoric acid butyl ester, polyphosphoric acid pentyl ester, polyphosphoric acid dimethyl ester, polyphosphoric acid diethyl ester, polyphosphoric acid dipropyl ester, polyphosphoric acid dibutyl ester, diphosphoric acid methyethyl ester, diphosphoric acid ethybutyl ester, diphosphoric acid ethylpropyl ester, diphosphoric acid ethylhexyl ester, trialkyl ester of di-, tri- tetra-, penta-phosphoric acid, tetraalkyl ester of di-, tri- tetra-, penta-phosphoric acid, pentaalkyl ester of di-, tri- tetra-, penta-phosphoric acid, and hexaalkyl ester of di-, tri- tetra-, penta-phosphoric acid.

Alkylphosphates and polyphosphoric acid esters are commercially available. For example, ethylphosphate is available from Acros Organics, Alfa Aesar, and Fluka Chemical Corp. Phosphonic acids, phosphinic acids, and their esters are also commercially available. Phosphonic acid is available from Acros Organics, Alfa Aesar, and Fluka Chemical Corp. Polyphosphoric acid esters, phosphonic acid esters, and phosphinic acid esters can be synthesized by the dehydration of mixtures of alcohol with polyphosphoric acid, phosphonic acid, and phosphinic acid, respectively. For example, phosphonic acid and ethanol can be used to synthesize phosphonic acid ethyl ester.

The metal phosphate sols are prepared by combining the metal oxide, the phosphate precursor, and the organosilane in any suitable order with a liquid such as water and/or an organic solvent. In this connection, the metal oxide, the phosphate precursor, and the organosilane may be simultaneously combined; the metal oxide and the phosphate precursor may be initially combined, followed by addition of the organosilane; the metal oxide and the organosilane may be initially combined, followed by addition of the phosphate precursor; or the organosilane and the phosphate precursor may be initially combined, followed by addition of the metal oxide. Optionally, the boron oxide compound may be added to the solution at any time. The presence of boron oxide compound in the reaction solution may allow one to maintain a clear solution throughout the reaction.

The metal oxide, phosphate precursor, organosilane, and optional boron oxide compound are combined in a liquid to form the metal phosphate sol. The liquid is at least one of water and an organic solvent. In one embodiment, the metal oxide, phosphate precursor, organosilane, and optional boron oxide compound are combined in a mixture of water and at least one organic solvent. In another embodiment, the metal oxide, phosphate precursor, organosilane, and optional boron oxide compound are combined in an organic solvent, followed by addition of water. Regardless of the liquid protocol, a certain minimum amount of water is desirably provided to facilitate formation of stable sols. To facilitate the formation of metal phosphate sols, in one embodiment, from about 10 mole % to about 80 mole % of the metal oxide, 5 mole % to about 70 mole % of the phosphate precursor, and from about 5 mole % to about 80 mole % of the organosilane are combined to form the metal phosphate sols.

Certain relative amounts of the silica sol and the metal oxide are combined in order to facilitate the formation of the nanocomposite containing the host silica sol and guest metal phosphate nanoparticles. In one embodiment, from about 20% to about 99.999% by weight of the silica sols and from about 0.001% to about 80% by weight of the metal phosphate sol are combined to form the nanocomposite containing the host silica sol and guest metal phosphate nanoparticles. In another embodiment, from about 50% to about 99.995% by weight of the silica sols and from about 0.005% to about 50% by weight of metal phosphate sol are combined to form the nanocomposite containing the host silica sol and guest metal phosphate nanoparticles. In yet another embodiment, from about 80% to about 99.99% by weight of the silica sols and from about 0.01% to about 20% by weight of metal phosphate sol are combined to form the nanocomposite containing the host silica sol and guest metal phosphate nanoparticles.

When a boron oxide compound is added to prepare the silica sol, the boron oxide compound can be removed once the silica sol is prepared. A silica sol without boron oxide compound also can be used as a host for the nanoparticles.

If desired, the boron oxide can be removed from a silica sol anytime including before or after making a host-guest silica sol and after making a silica sol nanocomposite.

The nanocomposites containing the host silica sols and at least one of guest metal nanoparticles, guest metal-chalcogenide nanoparticle, guest metal phosphate nanoparticle and guest metal oxide nanoparticle may be stored in a wet or dry state. For example, in the wet state, the hydrolysable silane, organofunctional silane, boron oxide, at least one of guest metal nanoparticles, guest metal-chalcogenide nanoparticle, guest metal phosphate nanoparticle and guest metal oxide nanoparticle, and organic solvent and/or water are simply stored in a container. In another embodiment, the nanocomposites are made by mixing at least one of metal nanoparticle, metal-chalcogenide nanoparticle, guest metal phosphate nanoparticle and metal oxide nanoparticle, the hydrolysable silane, the organofunctional silane, the acid catalyst, and a liquid to provide an intermediate sol, removing the liquid from the intermediate sol, and mixing a liquid and the base catalyst with the intermediate sol to provide the nanocomposite; or mixing the hydrolysable silane, the organofunctional silane, the acid catalyst, and a liquid to provide an intermediate sol, removing the liquid from the intermediate sol, and mixing at least one of metal nanoparticle, metal-chalcogenide nanoparticle, guest metal phosphate nanoparticle and metal oxide nanoparticle, a liquid, and the base catalyst with the intermediate sol to provide the nanocomposite, and the nanocomposites are simply stored in a container.

When storage in a wet state is employed, delivery and movement of the nanocomposites is facilitated by minimizing the amount of liquid. In one embodiment, the nanocomposites may be stored in a wet state for at least about 6 months. In another embodiment, the nanocomposites may be stored in a wet state for at least about 12 months. When stored in a wet state, flocculation is mitigated and/or eliminated. When stored in a wet or dry state, color changes are mitigated and/or eliminated.

When storing in a dry state, the nanocomposites in the wet state are subject to an evaporation technique, with optional heating, to remove the liquids present. A vacuum may be employed. The resultant dry nanocomposites are generally in a powder-like form. In one embodiment, the nanocomposites may be stored in a dry state for at least about 6 months. In another embodiment, the nanocomposites may be stored in a dry state for at least about 12 months.

In one embodiment, the dried nanocomposites contain less than about 0.5% by weight of water. In another embodiment, the dried nanocomposites contain less than about 0.1% by weight of water. In yet another embodiment, the dried nanocomposites contain less than about 0.05% by weight of water.

When storing in a dry state, the nanocomposites can be heated up to about 200° C. for about 2 hours without degradation. Also when storing in a dry state, the dried nanocomposites can be stored in at least a semi-airtight container, although this is not necessary. Due to the stability of the nanocomposites, an advantage is that they may be stored in the open air without degradation. This is because it is believed that nanocomposites resist water uptake and/or are stable to oxidation. It is another alternative to store the dried nanocomposites in an airtight container or in a vacuum pack/state.

A polymer composite contains at least a polymer material, and the silica sols and/or nanocomposites containing the host silica sols and at least one of the metal nanoparticles, metal-chalcogenide nanoparticles, metal phosphate nanoparticles and metal oxide nanoparticles. The polymer composite may further contain optional additives such as, for example, coupling agents (silane, titanium, or zirconium coupling agents), plasticizers, surfactants, catalysts, and fillers. Additives can enhance sol-polymer compatibility and/or nanocomposite-polymer compatibility. The silica sols and/or the metal nanocomposites are incorporated into the polymer matrix on a nanoscale basis in a substantially uniform manner. That is, the silica sols and/or the nanocomposites are uniformly dispersed throughout the polymer material. Generally speaking, polymer materials include glasses, ceramics, polymers, and the like. Generally speaking, polymers include thermosets, thermoplastics, synthetic rubbers, extrudable polymers, injection molding polymers, moldable polymers, and the like.

The nanocomposites containing at least one of the metal nanoparticles, metal-chalcogenide nanoparticles, metal phosphate nanoparticles and metal oxide nanoparticles have a small size permitting uniform incorporation into a polymer material. Since the nanocomposites can disperse within a medium such as a liquid or polymer material without aggregation, the small size is retained after incorporation.

The small size of the nanocomposites is controllable. In one embodiment, at least 50% by weight of the nanocomposites have a particle size from about 1 nm to about 250 nm, or a particle size of about 250 nm or less. In another embodiment, at least 50% by weight of the nanocomposites have a particle size from about 2.5 nm to about 100 nm, or a particle size of about 100 nm or less. In another embodiment, at least 50% by weight of the nanocomposites have a particle size from about 5 nm to about 50 nm, or a particle size of about 50 nm or less.

The controllable particle size is particularly advantageous because the presence of the nanocomposites in a medium such as polymer material may induce color shifts. For example, generally smaller sized CdS nanoparticles of the nanocomposites generate a blue color shift, while generally larger sized CdS nanoparticles of the nanocomposites generate a red color shift. The ability to generate color shifts makes the nanocomposites suitable for use in various optical applications.

The nanocomposites may be incorporated into a polymer material to form a polymer composite, or they may be used in applications where the metal nanoparticles can be used, such as in sensor devices, catalysts, photonics devices, high density magnetic recording components, recording media, other magnetic applications, color filters, dyes, optical filters, hair coloring products, solar energy conversion, flame retardant, corrosion protection coating, battery, photocatalysis, electronics, nonlinear optics, electroluminescent displays, photoluminescent sensors, nanoelectronic devices, biological probes, light-emitting quantum dots, quantum dot lasers, and the like.

The polymer is any suitable material capable of forming a pre-polymer material, a partially polymerized material or a polymer, that incorporates therein the silica sols and/or the nanocomposites. The polymer may be a dielectric material. The polymer may be polymer monomers, a B-staged polymer, or a polymer. In one embodiment, the polymer is at least one of a polyacrylate such as polymethylmethacrylate, an unsaturated polyester, a saturated polyester, a polyolefin (polyethylenes, polypropylenes, polybutylenes, and the like), an alkyd resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybemzoxazoles, polybenzthiazoles, polyfluorocarbones, polyphenylene ethers, polyarylates, cyanate ester polymers, copolymers of two or more thereof, and the like.

Suitable polymers include acrylic resins. Examples of acrylic monomers include monoacrylics, diacrylics, triacrylics, tetraacrylics, pentacrylics, etc. Examples of polyacrylates include polyisobornylacrylate, polyisobornylmethacrylate, polyethoxyethoxyethyl acrylate, poly-2-carboxyethylacrylate, polyethylhexylacrylate, poly-2-hydroxyethylacrylate, poly-2-phenoxylethylacrylate, poly-2-phenoxyethylmethacrylate, poly-2-ethylbutylmethacrylate, poly-9-anthracenylmethyl methacrylate, poly-4-chlorophenylacrylate, polycyclohexylacrylate, polydicyclopentenyloxyethyl acrylate, poly-2-(N,N-d iethylamino)ethyl methacrylate, poly-dimethylaminoeopentyl acrylate, poly-caprolactone 2-(methacryloxy) ethylester, and polyfurfurylmethacrylate, poly(ethylene glycol)methacrylate, polyacrylic acid and poly(propylene glycol)methacrylate.

Examples of suitable diacrylates which can be used to form polyacrylates include 2,2-bis(4-methacryloxyphenyl) propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol dimethacrylate, 1,6-hexanediol diacrylate, neopentyl glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cycloheanedimethanol dimethacrylate, and diacrylic urethane oligomers (reaction products of isocyanate terminate polyol and 2-hydroethylacrylate).

Examples of triacrylates which can be used to form polyacrylates include tris(2-hydroxyethyl)isocyanurate trimethacrylate, tris(2-hydroxyethyl)isocyanurate triacrylate, trimethylolpropane trimethacrylate, trimethylolpropane triacrylate and pentaerythritol triacrylate. Examples of tetracrylates include pentaerythritol tetraacrylate, di-trimethylopropane tetraacrylate, and ethoxylated pentaerythritol tetraacrylate. Examples of pentaacrylates include dipentaerythritol pentaacrylate and pentaacrylate ester.

Polyacrylates include other aliphatically unsaturated organic compounds, such as polyacrylamides and unsaturated polyesters, which are condensation products of unsaturated dicarboxylic acids and diols, and vinyl compounds, or compounds having a terminal double bond. In one embodiment, these materials are co-cured with the acrylic component by free radical technique. Examples of vinyl compounds include N-vinylpyrrollidone, styrene, vinyl naphthalene and vinylphtalimide. Polyacrylamides (including poly(meth)acrylamide derivatives) are commercially available. Some of the particular (meth)acrylamide derivatives include N-alkyl- or N-alkylene-substituted or unsubstituted (meth)acrylamides. Specific examples thereof are acrylamide, methacrylamide, N-methacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-isopropylacrylamide, N-n-propylacrylamide, N-isopropylmethacrylamide, N-n- propylmethacrylamide, N-acryloyloylpyrrolidine, N-methacryloylpyrrolidine, N-acryloylpiperidine, N-methacryloylpiperidine, N-acryloylhexahydroazepine, N-acryloylmorpholine and N-mathacryloylmorpholine.

Other suitable polymers include unsaturated and saturated polyesters including alkyd resins. The polyesters may be condensation polymers derived by the condensation of polybasic acids and anhydrides, such as dibasic acids or anhydrides, with polyols, such as dihydroxy or trihydroxy compounds. The polyesters may include in the polymeric chain, varying proportions of other saturated or aromatic dibasic acids and anhydrides which are or are not subject to crosslinking.

The unsaturated polyesters are prepared by reacting the one or more unsaturated polybasic acids or anhydrides with the polyols (di- or tri-hydroxy compounds) in approximately equal proportions. Examples of such polyesters include polyesters prepared from: maleic anhydride and propylene glycol (1:1 molar ratio); isophthalic acid, maleic anhydride and propylene glycol (1:2:3 and 1:1:2 molar ratios); and adipic acid, maleic anhydride and propylene glycol (1:2:3 molar ratio). A wide variety of polyester resins that can be used are commercially available.

Suitable polymers include epoxy resins. Epoxy resins include resins comprised of monomers, oligomers, and polymers containing one or more oxirane rings. A wide variety of such resins are available commercially. Such resins have either a mixed aliphatic-aromatic or an exclusively non-benzeneoid (i.e., aliphatic or cycloaliphatic) molecular structure. Representative examples of acceptable substituent groups include halogens, ester groups, ether groups, sulfonate groups, siloxane groups, nitro groups, and phosphate groups.

Epoxy resins are available from a wide variety of commercial sources. One group is known by the general trade designation "Epon" resins and are available from Shell Chemical Co. For example, "Epon 820" is an epoxy resin having an average molecular weight of about 380 and is prepared from 2,2-bis-(p-hydroxyphenyl)propane and epichlorohydrin. Similarly, "Epon 1031" is an epoxy resin having an average molecular weight of about 616 and is prepared from epichlorohydrin and symmetrical tetrakis-(p-hydroxyphenyl)ethane. "Epon 828" has a molecular weight of 350-400 and an epoxide equivalent of about 175-210. Epoxy resins such as Araldite 6010, manufactured by Ciba-Geigy can also be utilized. These epoxy resins are of the glycidyl-type epoxide, and are preferably diglycidyl ethers of bis-phenol A which are derived from bisphenol and epichlorohydrin.

Another group of commercially available epoxy resins are identified under the general trade designation EPI-REZ (Celanese Resins, a Division of Celanese Coatings Company). For example, EPI-REZ 510 and EPI-REZ 509 are commercial grades of the diglycidyl ether of Bisphenol A differing slightly in viscosity and epoxide equivalent. Another group of epoxy resins are available from Furane Plastics Inc., Los Angeles, Calif. under the general trade designations EPIBOND and EPOCAST. For example, EPIBOND 100A is a one component epoxy resin powder available from Furane which is curable to a hard resin in the absence of any hardener.

Liquid forms of epoxy resin are also useful. These liquid forms normally comprise very viscous liquids requiring some degree of heating to permit withdrawal from storage containers. Certain "D.E.R." and "D.E.W." resins obtainable from Dow Chemical Company and "Epotuf" liquid epoxy resins obtainable from Reichhold Chemicals Inc. are examples of such resins preferred for employment in accordance with the invention. An example is an "Epotuf" liquid epoxy resin in the undiluted medium high viscosity #37-140 having an epoxide equivalent weight of 180-195, a viscosity (ASTM D445) of 11,000-14,000 cps at 25° C., and a Gardner Color Maximum of 3.

In some embodiments the epoxy resins may be "solubilized" by neutralization with a basic compound such as an organic amine. Examples of amines include amines and hydroxyamines including diethylamine, triethylamine, triethanolamine, dimethylethanolamine, etc. Epoxy resins also include polyamide modified epoxy resins, such as AF-42 from Minnesota Mining and Manufacturing Co.

Additional examples of the epoxy resins derived from amines include tetraglycidyldiaminodiphenylmethane, triglycidyl-p-aminophenol, triglycidyl-m-aminophenol and triglycidylaminocresol and their isomers, examples of the epoxy resins derived from phenols include bisphenol A epoxy resins, bisphenol F epoxy resins, bisphenol S epoxy resins, phenol-novolak epoxy resins, cresol-novolak epoxy resins and resorcinol epoxy resins, and examples of the epoxy resins whose precursors are compounds having a carbon-carbon double bond are alicyclic epoxy resins. Moreover, brominated epoxy resins prepared by brominating these epoxy resins can be used, but the subject invention is not restricted to the use of these compounds. Furthermore, mixtures of two or more of the epoxy resins can be used and monoepoxy compounds can also be incorporated.

Generally, epoxy resins for use in the invention are compositions containing glycidyl ether monomers. Representative examples of these are the glycidyl ethers of polyhydric phenols obtained by reacting a polyhydric phenol with an excess of chlorohydric, such as epichlorohydrin. Specific examples of epoxy resins include 2,2-bis[4-(2,3-epoxypropoxy)phenyl]propane(diglycidyl ether of bisphenol A) and commercially available materials under the trade designation "Epon 828F", "Epon 1004F" and "Epon 1001F" available from Shell Chemical Co., "DER-331", DER-332" and "DER-334" available from the Dow Chemical Co. Preferred is the diglycidyl ether of bisphenol A, "CMD 35201" available from Rhone Poulenc, Inc., Louisville, Ky. Other suitable epoxy resins include glycidyl ethers of phenol formaldehyde novolak resins (e.g., "DEN-431" and "DEN-438" available from the Dow Chemical Co.), and resorcinol digylcidyl ether. Additional examples of epoxides are described in U.S. Pat. No. 3,018,262, incorporated herein by reference.

Epoxy resins further include UV curable epoxies and cycloaliphatic epoxy resins. UV curable epoxies and cycloaliphatic epoxy resins are available under the trade designation Cyracure® specifically including products 6100, 6105, 6110, and 6351 from Union Carbide/Dow Chemical.

Suitable polymers include polyamides. In particular, the polymers may be aliphatic or aromatic polyamides. Polyamides are commercially available. Examples of polyamides include those under the trade designations Zytel available from DuPont, Capron from AlliedSignal, Texapol from Hanna, Ashlene from Ashley, Ultramid from BASF, Durethan from Bayer, Grilamid from EMS, Vestamid from Huls America, Vydyne from Monsanto, Wellamid from Wellman and others.

Specific examples of polyamides include nylon 6 (polycaprolactam), nylon 6/6 (polyhexamethyleneadipamide), nylon 6/10 (condensation product of hexamethylenediamine and sebacic acid), nylon 6/12, nylon 6/T (polyhexamethylene terephthalamide), nylon 7 (polyenanthamide), nylon 8

(polycapryllactam), nylon 9 (polypelargonamide), nylon 10, nylon 11, nylon 12, nylon 55, nylon XD6 (poly methaxylylene adipamide), nylon 6/I, poly-alanine, NOMAX® 410 available from DuPont, polyamides under the trade designations PA 7030 and 5050 available from Dow, and Ultramid K1297/2 available from BASF.

Suitable polymers include polyimides. Polyimides can be prepared by reacting a diisocyanate with a dianhydride, or a dianhydride with an aromatic diamine (such as 3,3',4,4'-benzophenonetetracarboxylic dianhydride-co-4,4'-oxydianiline and methylenedianiline). Examples of polyimides include KAPTON and VESPEL available from DuPont.

Suitable polymers include polyetherimides. Polyetherimides are polymers containing ether and imide linkages. For example, polyetherimides can be prepared by reacting at least one diamine, such as m-phenylenediamine or p-phenylenediamine, with at least one ether dianhydride, such as 2,2-bis[(3,4-dicarboxyphenoxy)phenyl]propane dianhydride. Polyetherimides are commercially available. Examples of polyetherimides include those under the trade designation ULTEM-1000, ULTEM-4000 and ULTEM-6000 from General Electric, RTP 2101, 2103 and 2105 from RTP and Thermofil W-10FG0100, W-20FG0100 and W-30FG0100 from Thermofil. Polyetherimides also include silicone polyetherimides.

Suitable polymers also include polyamideimides. Polyamideimides may be prepared by condensing an imide and an amide. Polyamideimides are commercially available. Examples of polyamideimides include those under the trade designation TORLONTM available from Amoco and Lack E 3560/32 and 3561/27 available from Herberts Gmbh.

Suitable polymers include polyesterimides. Polyesterimdes are commercially available. Examples of polyesteramides include TERBEC® 533 L-33 available from BASF, IMIDEX-E available from General Electric and those made according to U.S. Pat. Nos. 3,426,098 and 3,697,471 which are herein incorporated by reference.

Suitable polymers include polyesteramideimides. Polyesteramideimides are commercially available. Examples of polyesteramideimides include copolymers of any combination of a polyester, a polyamide and polyimide.

In one embodiment, polymer composites contain from about 1% by weight to about 99.99% by weight of the polymer and from about 0.01% by weight to about 99% by weight of the silica sols and/or the nanocomposites containing at least one of the metal nanoparticles, metal-chalcogenide nanoparticles, metal phosphate nanoparticles and metal oxide nanoparticles. In another embodiment, the polymer composite contains a major amount of the polymer and a minor amount of the silica sols and/or the nanocomposites, and optionally a minor amount of additives such as coupling agents. A major amount means at least 50% by weight or more, while a minor amount means less than 50% by weight. In another embodiment, polymer composites contain from about 20% by weight to about 99.9% by weight of the polymer and from about 0.1% by weight to about 80% by weight of the silica sols and/or the nanocomposites containing at least one of the metal nanoparticles, metal-chalcogenide nanoparticles, metal phosphate nanoparticles, and metal oxide nanoparticles. In yet another embodiment, polymer composites contain from about 70% by weight to about 99% by weight of the polymer and from about 1% by weight to about 30% by weight of the silica sols and/or the nanocomposites containing the metal nanoparticles, metal-chalcogenide nanoparticles, metal phosphate nanoparticles, and metal oxide nanoparticles.

The polymer composite is made by combining suitable amounts of the polymer and the silica sols and/or the nanocomposites containing at least one of the metal nanoparticles, metal-chalcogenide nanoparticles, metal phosphate nanoparticles, and metal oxide nanoparticles. If the silica sols and/or the nanocomposite are stored in a dry state, it can be combined with an organic solvent and/or water before combined with the polymer. The polymer is preferably in a liquid or semi-liquid state. The polymer and the silica sols and/or the metal nanocomposite are mixed to facilitate uniform distribution of the silica sols and/or the metal nanocomposite within the polymer. In one specific embodiment, the silica sols powder and/or the nanocomposite powder (stored in a dry state) is combined with a polymer or prepolymer powder, and the mixture is then melted and molded or extruded.

After combining and mixing suitable amounts of the polymer and the silica sols and/or the nanocomposites containing at least one of the metal nanoparticles, metal-chalcogenide nanoparticles, metal phosphate nanoparticles, and metal oxide nanoparticles, the mixture is then cured, molded, extruded, formed, or subjected to suitable polymer processing to form a polymer composite having the silica sols and/or the nanocomposites substantially uniformly dispersed therein. In the case of a translucent polymer, for example a polyacrylate, the resultant polymer composite is also translucent, indicating that the silica sols and/or the nanocomposite are dispersed on a nanoscale. Polymer composites are generally smooth, further indicating that the silica sols and/or the nanocomposites are dispersed on a nanoscale.

The subject invention further provides methods of improving certain properties in polymer compositions, such as one or more of methods of improving strength, methods of improving corona resistance, methods of improving plasma resistance, methods of improving resistance to organic solvents, methods of improving high temperature stability, methods of improving flame retardancy, methods of improving oxidative stability, methods of modifying refractive index, methods of improving fracture properties, methods of improving abrasion resistance, methods of improving liquid permeability, methods of improving gas permeability including methods of improving gas permeability to specific gases, methods of improving (low) hysteresis loss (low rolling resistance), methods of improving corrosion protection, and methods of improving field responsive capability. The methods of improving certain properties in polymer compositions are accomplished by incorporating the silica sols and/or the nanocomposites into polymer materials.

The following examples illustrate the subject invention. Unless otherwise indicated in the following examples and elsewhere in the specification and claims, all parts and percentages are by weight, all temperatures are in degrees Centigrade, RT is room temperature, and pressure is at or near atmospheric pressure.

COMPARATIVE EXAMPLE 1

Comparative Example 1 involves the preparation of silica sols using an acid catalyst, and without a boron oxide compound. Tetraethoxysilane (TEOS, 0.122 gm, 0.59 mmol) is mixed with 2-propanol (0.6 gm) and, after addition of 2% HCl (0.008 gm) and DI water (0.082 gm, 4.6 mmol), stirred at RT/overnight. Addition of phenyltrimethoxysilane (0.145 gm, 0.73 mmol) followed by stirring at RT/overnight and 80° C./3 hrs gives a clear solution. Removal of the volatiles in vacuo followed by heat-treatment at 100° C./30 min gives colorless residues (0.169 gm) that are soluble in methoxyethanol when heated.

The dried sol (0.0205 gm) is further heat treated at 190° C./1 hr to reduce its weight to 0.0175 gm. The dried sol becomes insoluble in any of the solvents examined, including methoxyethanol, xylene, toluene, methylene chloride, methylisobutylketone, tetrahydrofuran, and N-methylpyrrolidinone (NMP).

COMPARATIVE EXAMPLE 2

Comparative Example 2 involves the preparation of silica sols using an acid catalyst, and without a boron oxide compound. A solution of TEOS (0.16 gm, 0.77 mmol) in 2-propanol (0.42 gm) is treated with 2% HCl (0.034 gm) and DI water (0.042 gm) at RT/overnight, and then with phenyltrimethoxysilane (0.107 gm, 0.54 mmol) at RT/overnight. The resulting clear solution is equally divided into two.

The half of the solution is stirred at 80° C./5 hrs after addition of methoxyethanol (0.075 gm) but without boric acid. The sol solution (0.107 gm) is then heat-treated at 200° C./1.5 hrs after removing most of the volatiles to give colorless powders (0.016 gm). The dried powder is not soluble in any of solvents tested including methxoyethanol, toluene and NMP.

COMPARATIVE EXAMPLE 3

Comparative Example 3 involves the preparation of silica sols using an acid catalyst, and without a boron oxide compound. A solution of TEOS (0.26 gm, 1.25 mmol) in 2-propanol (1.0 gm) is first treated with 2% HCl (0.048 gm) and DI water (0.028 gm, 1.6 mmol) at RT/30 min., and then with octyltriethoxysilane (0.12 gm, 0.43 mmol) at RT/overnight. The resulting clear solution is equally divided into two.

The half of the solution is further stirred at 80° C./5 hrs. Removal of the volatiles and heat treatment at 160° C./1 hr gives colorless residues (0.101 gm). The dry sol is not soluble any of the solvents tested including methoxyethanol, xylene, THF, and NMP.

COMPARATIVE EXAMPLE 4

Comparative Example 4 involves the preparation of silica sols using an aluminum catalyst and without a boron oxide compound. A solution of TEOS (0.147 gm, 0.71 mmol) and phenyltrimethoxysilane (0.134 gm, 0.68 mmol) in methoxyethanol (0.5 gm) is prepared in a vial. After addition of aluminum di-s-butoxide ethylacetoacetate catalyst (0.002 gm) followed by DI water (0.07 gm, 3.9 mmol), the resulting solution is stirred at RT/overnight and 100° C./2 hrs to give a colorless solution. Removal of the volatiles in vacuo followed by heat treatment at 160° C./1 hr yields colorless solid residues (0.15 gm). The dried solid is not soluble in any of the solvents testes including methoxyethanol, toluene, ethyleneglycol, NMP.

COMPARATIVE EXAMPLE 5

Comparative Example 5 involves the preparation of silica sols using an acid catalyst, and without a boron oxide compound. A solution of TEOS (0.142 gm, 0.68 mmol) and phenyltrimethoxysilane (0.139 gm, 0.7 mmol) in 2-propanol (0.53 gm) is combined with polyphosphoric acid (0.001 gm) followed by DI water (0.048 gm, 2.7 mmol) and stirred at RT/48 hrs and 80° C./10 hrs. Small portions of the sol solution (0.09 gm) are then heat-treated at 200° C./1.5 hr after removing most of the volatiles in vacuo to give colorless residues (0.0145 mg). The dried powder is not soluble in any of the solvents tested including methxoyethanol, toluene and NMP.

COMPARATIVE EXAMPLE 6

Comparative Example 6 involves the preparation of silica sols using a base catalyst, and without a boron oxide compound. A solution of TEOS (0.175 gm, 0.84 mmol) in 2-propanol (0.5 gm) is stirred at RT/1 hr after addition of 7.5% NEt$_4$OH in methanol (0.017 gm) and DI water (0.044 gm, 2.4 mmol) to give a hazy solution. Addition of phenyltrimethoxysilane (0.18 gm, 0.91 mmol) followed by stirring at RT/overnight and 80° C./5 hrs gives a highly milky solution. Removal of the volatiles followed by heat treatment at 200° C./1 hr gives colorless residues that are not soluble in any of the solvents tested including methxoyethanol, THF, toluene, NMP.

COMPARATIVE EXAMPLE 7

Comparative Example 7 involves the preparation of silica sols using a base catalyst, and without a boron oxide compound. A clear solution of TEOS (0.267 gm, 1.28 mmol) and phenyltrimethoxysilane (0.256 gm, 1.29 mmol) in 2-propanol (0.6 gm) is combined with 7.5% NEt$_4$OH in methanol (0.046 gm) and DI water (0.1 gm, 5.6 mmol) and stirred at RT/overnight and 80° C./5 hrs. The resulting milky solution is vacuum dried and then heat treated at 200° C./1 hr to give colorless residues that are not soluble in any of the solvents tested including methxoyethanol, THF, toluene, NMP.

COMPARATIVE EXAMPLE 8

Comparative Example 8 involves the preparation of Au nanoparticles hosted by silica sol that is made using an acid catalyst, and without a boron oxide compound. A solution containing TEOS (0.168 gm, 0.81 mmol), phenyltrimethxoysilane (0.166 gm, 0.84 mmol) and 3-mercaptopropyltrimethoxysilane (0.0014 gm, 0.007 mmol) in methoxyethanol (0.5 gm) is prepared. The solution is wrapped with an aluminum foil and then treated with Au(OH)$_3$ (0.002 gm, 0.008 mmol) at RT/30 min. Addition of DI water (0.1 gm, 5.6 mmol) and 2% HCl (0.015 gm) followed by stirring at RT/overnight gives a brown solution. The solution is then further stirred at RT/24 hrs under a fluorescent light to gradually generate a wine red solution with minor black precipitates. Removal of the precipitates (1 mg) by filtration gives a clear wine red solution. The sol solution (0.03 gm) is cast on a glass plate under N$_2$ to form a clear thin film which, upon heating to >100° C., exhibited enhanced absorption at λmax 532 nm. The sol film heat-treated at 190° C. is not soluble in any of the solvents tested including methoxyethanol, toluene, methylisobutylketone, methylene chloride and NMP.

EXAMPLE 1

Example 1 involves the preparation of silica sols using a boron oxide compound. A clear solution of boric acid (0.08 gm, 1.3 mmol) and 2-propanol (1 gm) in glass vial with a magnetic stirring bar is combined with TEOS (0.31 gm, 1.5 mmol) and 2% HCl (0.012 gm). It is stirred at RT/overnight and 80° C./6 hrs. Phenyltrimethoxysilane (0.3 gm, 1.5 mmol) is added and the resulting solution is further stirred overnight to give a clear solution. Removal of the volatiles in vacuo followed by heat-treatment at 130° C./1 hr gives colorless residues (0.42 g) that are readily re-dissolved in methoxyethanol to form a clear solution. The sol powder (0.0256 gm) in a vial is further heat-treated at 190° C./1 hr in an oven to reduce its weight to 0.0192 gm. The residues are readily soluble in methoxyethanol (0.5 gm) to give a colorless clear solution which shows no formation of precipitates even after stored at RT for 12 months. The remaining sol powders heat-treated at 130 C are further heat-treated at 190 C/1 hr and then stored in a vial at RT for 12 months. The stored dried sol (0.025 gm) is readily soluble in methoxyethanol 90.5 gm) to give a colorless clear solution.

EXAMPLE 2

Example 2 involves the preparation of silica sols using an acid and base catalyst. TEOS (0.122 gm, 0.59 mmol) is mixed with 2-propanol (0.6 gm) and, after addition of 2% HCl (0.008 gm) and DI water (0.082 gm, 4.6 mmol), stirred at RT/overnight. Addition of phenyltrimethoxysilane (0.145 gm, 0.73 mmol) followed by stirring at RT/overnight and 80° C./3 hrs gives a clear solution. Removal of the volatiles in vacuo followed by heat-treatment at 100° C./30 min gives colorless residues (0.169 gm) that are soluble in methoxyethanol when heated.

The dried sol powder (0.0153 gm) is dissolved in methoxyethanol (0.4 gm) and combined with 7.5% NEt$_4$OH in methanol (3 mg). It is stirred at RT/overnight and 100° C./1 hr. The resulting clear solution is dried under vacuum and then heat treated at 200° C./1 hr to give colorless residues (0.0138 gm). Addition of methoxyethanol (0.4 gm) gives a clear solution. The sol solution stored in a closed vial for 12 months remains to be clear and shows no formation of precipitates.

EXAMPLE 3

Example 3 involves the preparation of silica sols using a boron oxide compound. A solution of TEOS (0.16 gm, 0.77 mmol) in 2-propanol (0.42 gm) is treated with 2% HCl (0.034 gm) and DI water (0.042 gm) at RT/overnight, and then with phenyltrimethoxysilane (0.107 gm, 0.54 mmol) at RT/overnight. The resulting clear solution is equally divided into two.

The half solution is treated with boric acid (0.0098 gm, 0.16 mmol, TEOS/B=1/0.4) pre-dissolved in methoxyethanol (0.075 gm) at 80° C./5 hrs. The sol solution (0.08 gm) is then heat-treated at 200° C./1.5 hrs after removing most of the volatiles to give colorless powders (0.013 gm). Addition of methoxyethanol (0.5 gm) completely dissolves the dried sol to give a colorless clear solution.

EXAMPLE 4

Example 4 involves the preparation of silica sols using a boron oxide compound and octyltriethoxysilane. A solution of TEOS (0.633 gm, 3 mmol) in 2-propanol (0.4 gm) is combined with boric acid (0.19 gm, 3 mmol) and the resulting hazy solution is stirred at RT/overnight and 80° C./2 hrs to give a clear solution. After addition of octyltriethoxysilane (0.737 gm, 2.7 mmol) and DI water (0.11 gm, 6.1 mmol), the solution is further stirred at RT/overnight and 80° C./6 hrs. Removal of the volatiles in vacuo followed by heat-treatment at 105° C./2 hrs gives colorless solid residues (0.787 gm). The dried sol powder (0.02 gm) is charged in a glass vial, heat-treated to 180° C./1 hr, and mixed with methoxyethanol (0.6 gm) to give a colorless clear solution.

EXAMPLE 5

Example 5 involves the preparation of silica sols using a boron oxide compound. A solution of TEOS (0.26 gm, 1.25 mmol) in 2-propanol (1.0 gm) is first treated with 2% HCl (0.048 gm) and DI water (0.028 gm, 1.6 mmol) at RT/30 min., and then with octyltriethoxysilane (0.12 gm, 0.43 mmol) at RT/overnight. The resulting clear solution is equally divided into two.

The half of the solution is combined with boric acid (0.022 gm, 0.35 mmol, TEOS/B=1/0.56) pre-dissolved in methoxyethanol (0.17 gm) and then stirred at 80° C./5 hrs. Removal of the volatiles followed by heat treatment at 160° C./1 hr gives colorless residues (0.108 gm). A mixture of the dry sol (0.016 gm) and methoxyethanol (0.5 gm) is clear and colorless. The dry sol (0.0255 gm) is further heat treated at 190° C./1 hr to reduce its weight to 0.023 gm. The sol is soluble in hot xylene and NMP.

EXAMPLE 6

Example 6 involves the preparation of silica sols using a boron oxide compound. TEOS (0.133 gm, 0.64 mmol) is mixed with boric acid (0.04 gm, 0.65 mmol) pre-dissolved in methoxyethanol (0.27 gm). After addition of 2-propanol (0.6 gm) and aluminum di-s-butoxide ethylacetoacetate catalyst (0.003 gm), the solution is stirred at RT/overnight. After addition of phenyltrimethoxysilane (0.135 gm, 0.68 mmol) and DI water (0.04 gm, 2.2 mmol) the solution is further stirred at RT/overnight and 100° C./3 hrs to give a colorless solution. Removal of the volatiles in vacuo followed by heat-treatment at 130° C./1 hr gives colorless residues (0.197 gm) that are readily re-resolved in methoxyethanol. Additional heat-treatment of the sol powder (0.03 gm) at 190° C./1 hr reduces its weight to 0.0236 gm. Addition of methoxyethanol (0.5 gm) gives a colorless clear solution.

EXAMPLE 7

Example 7 involves the preparation of silica sols using a boron oxide compound. A solution of TEOS (0.142 gm, 0.68 mmol) and phenyltrimethoxysilane (0.139 gm, 0.7 mmol) in 2-propanol (0.53 gm) is combined with polyphosphoric acid (0.001 gm) followed by DI water (0.048 gm, 2.7 mmol) and stirred at RT/48 hrs and 80° C./10 hrs.

The solution (0.8 gm) is then treated with boric acid (0.0071 gm, 0.11 mmol, TEOS/B=1/0.19) at 80° C./1 hr. Portion of the resulting clear solution (0.087 gm) is then heat-treated at 200° C./1.5 hr after removing most of the volatiles in vacuo to give colorless residues (14.2 mg). The dried sol is readily dissolved in methoxyethanol (0.5 gm) to give a clear solution.

EXAMPLE 8

Example 8 involves the preparation of silica sols using a boron oxide compound. A solution of TEOS (0.092 gm, 0.44 mmol) in 2-propanol (0.3 gm) is treated with boric acid (0.027 gm, 0.44 mmol) at RT/1 hr to give a hazy solution. The solution is combined with 7.5% NEt$_4$OH in methanol (0.013 gm) and further stirred at RT/overnight (the solution remained hazy). Addition of phenyltrimethoxysilane (0.088 gm, 0.44 mmol) and DI water (0.03 gm, 1.7 mmol) followed by stirring at RT/overnight and at 80° C./5 hrs gives a clear solution. Removal of the volatiles followed by heat treatment at 200° C./1 hr gives colorless residues (0.093 gm). The dried sol powder (0.016 gm) is readily soluble in methoxyethanol (0.5 gm) to give a clear solution.

EXAMPLE 9

Example 9 involves the preparation of silica sols using a boron oxide compound. A clear solution of TEOS (0.177 gm, 0.85 mmol) and phenyltrimethxoysilane (0.164 gm, 0.83 mmol) in 2-propanol (0.5 gm) is combined with boric acid (0.051 gm, 0.82 mmol) pre-dissolved in 2-propanol (0.39 gm), 7.5% $NEt_4OH$ in methanol (0.010 gm) and then DI water (0.075 gm, 4.2 mmol). The resulting hazy solution is stirred at RT/overnight and 80° C./2 hrs to give a clear solution. Removal of the volatiles in vacuo followed by heat treatment at 135° C./1 hr gives colorless residues (0.181 gm). The dried sol (0.027 gm) is further heat-treated at 200° C./1 hr to reduce its weight to 0.023 gm and then mixed with methoxyethanol (0.5 gm) to give a clear solution.

EXAMPLE 10

Example 10 involves the removal of boron oxide compound. The sol powder prepared in Example 9 (heat-treated at 135° C., 0.018 gm) is combined with methanol (0.5 gm) and refluxed for 1 hr. Solid residues obtained by centrifugal separation are collected and again treated with methanol. The residues are then heat-treated at 80° C./1 hr to give colorless powders (0.015 gm) that are readily soluble in methoxyethanol.

EXAMPLE 11

Example 11 involves the preparation of CdS nanoparticles hosted by silica sol. The dried sol prepared in Example 1 (0.025 gm) is dissolved in methoxyethanol (0.75 gm), stirred with 3-mercaptopropyltrimethoxysilane (0.73 mg) at RT/4 hrs, stirred with $Cd(OOCCH_3)_2.2H_2O$ (2.4 mg) at RT/overnight and 80° C./3 hrs, and finally stirred with thioacetoamide (0.6 mg) at RT/overnight. The resulting yellow solution is clear and emits a bright orange color under UV exposure. Removal of the volatiles in vacuo followed by heat treatment at 130° C. gives yellowish residues that also emits a bright orange color under UV exposure.

EXAMPLE 12

Example 12 involves the preparation of CdS nanoparticles hosted by silica sol. The dried sol prepared in Example 1 (0.025 gm) is dissolved in methoxyethanol (0.75 gm), stirred with $Cd(OOCCH_3)_2.2H_2O$ (1.9 mg) at RT/1 hr, stirred with 3-mercaptopropyltrimethoxysilane (0.87 mg) at RT/2 hrs, and finally stirred with thioacetoamide (0.3 mg) at RT/overnight. The resulting colorless clear solution emits a bright yellow color under UV exposure. Removal of the volatiles in vacuo followed by heat treatment at 130° C. gives yellowish residues that also emits a bright yellow color under UV exposure.

EXAMPLE 13

Example 13 involves the preparation of CdS nanoparticles hosted by silica sol. A solution of TEOS (0.213 gm, 1 mmol) in 2-propanol ((0.6 gm) is treated with $Cd(OOCCH_3)_2.2H_2O$ (0.016 mg, 0.06 mmol) and methoxyethanol (0.3 gm) for 1 hr. The solution is then treated with boric acid (0.056 gm, 0.9 mmol) predissolved in 2-propanol (0.6 gm) and methoxyethanol (0.3 gm) at RT/2 hrs and then with 2% HCl (0.06 gm) for 1 hr. Finally, the solution is treated with phenyltrimethoxysilane (0.206 gm, 1 mmol) at RT/overnight and 80° C./2 hrs. Removal of the volatiles in cacuo followed by heat treatment at 140° C./1 hr gives colorless powders (0.291 gm). The dried sol (0.047 gm) is dissolved in methoxyethanol (0.5 gm) and treated with 3-mercaptopropyltrimethoxysilane (0.76 mg) at RT/2 hrs and 80° C./1 hr, and then with thioacetamide (0.56 mg) at RT/overnight to give a colorless clear solution that exhibits a bright yellow emission under UV exposure.

Separately, the above sol powder (0.032 gm) is further heat-treated at 190° C./1 hr (weight reduction to 0.0247 gm), dissolved in methoxyethanol (0.5 gm), treated with 3-mercaptopropyltrimethoxysilane (0.61 mg) at RT/2 hrs and 80° C./1 hr, and then with thioacetamide (0.43 mg) at RT/overnight. The resulting solution is colorless clear and exhibits a bright yellow emission under UV exposure. The solution stored in a closed vial for 12 months remains to be clear and shows no formation of precipitates.

EXAMPLE 14

Example 14 involves the preparation of Au nanoparticles hosted by silica sol.

A solution of TEOS (0.176 gm, 0.85 mmol) in methoxyethanol (0.8 gm) in a glass vial is wrapped with an Al foil and treated with (i) 3-mercaptotrimethoxysilane (0.0096 gm, 0.049 mmol) at RT/4 hrs, (ii) $Au(OH)_3$ (0.0073 gm, 0.029 mmol) at RT/30 min, boric acid (0.051 gm, 0.82 mmol) pre-dissolved in methoxyethanol (0.34 gm) at RT/overnight, (iv) phenyltrimethoxysilane ((0.158 gm, 0.8 mmol) and DI water (0.048 gm, 2.7 mmol) at RT/overnight. The solution is then further stirred at RT/24 hrs under a fluorescent light to gradually generate a wine red solution with minor black precipitates. Removal of the precipitates (2.4 mg) by filtration gives a clear wine red solution that is allowed to stand at RT in a capped glass vial for 11 months. The clear wine-red sol solution (0.1 gm) is then charged in a vial and, after removing the volatiles in vacuo, heat-treated at 140° C./1 hr to give wine red residues (0.014 gm). Addition of methoxyethanol allows to completely dissolve the sol residues and gives a clear wine red solution.

EXAMPLE 15

Example 15 involves the preparation of Au nanoparticles hosted by silica sol.

A solution containing TEOS (0.168 gm, 0.81 mmol), phenyltrimethxoysilane (0.166 gm, 0.84 mmol) and 3-mercaptopropyltrimethoxysilane (0.0014 gm, 0.007 mmol) in methoxyethanol (0.5 gm) is prepared. The solution is wrapped with an aluminum foil and then treated with $Au(OH)_3$ (0.002 gm, 0.008 mmol) at RT/30 min. Addition of DI water (0.1 gm, 5.6 mmol) and 2% HCl (0.015 gm) followed by stirring at RT/overnight gives a brown solution. The solution is then further stirred at RT/24 hrs under a fluorescent light to gradually generate a wine red solution with minor black precipitates. Removal of the precipitates (1 mg) by filtration gives a clear wine red solution.

The sol solution (0.236 gm, 25% of the total) is treated with boric acid (0.0044 gm, 0.07 mmol, TEOS/B=1/0.35) pre-dissolved in methoxyethanol (0.034 gm) at RT/overnight. Removal of the volatiles followed by heat treatment at 200° C./1 hr gives purple residues. Addition of methoxyethanol followed by filtration to remove black precipitates (~0.5 mg) gives a clear wine red solution.

EXAMPLE 16

Example 16 involves the preparation of Au nanoparticles hosted by silica sol.

A solution containing TEOS (0.177 gm, 0.85 mmol), phenyltrimethxoysilane (0.166 gm, 0.84 mmol) and 3-aminopropyltrimethoxysilane (0.002 gm, 0.011 mmol) in methoxyethanol (0.56 gm) is prepared. The solution is wrapped with an Al foil and then treated with $Au(OH)_3$ (0.002 gm, 0.008 mmol) at RT/30 min. Addition of DI water (0.1 gm, 5.6 mmol) followed by stirring at RT/2 days gives a yellow-brown solution. After addition of boric acid (0.035 gm, 0.56 mmol), the solution is then further stirred at RT/24 hrs under a fluorescent light to slowly generate a wine red solution with minor black precipitates. Removal of the precipitates (2 mg) by filtration gives a clear wine red solution (0.19 gm). The sol solution (0.03 gm) is cast on a glass plate under $N_2$ to form a clear wine red thin film. The sol film heat-treated at 200° C./1 hr is readily soluble in methoxyethanol to give a clear wine red solution.

EXAMPLE 17

Example 17 involves the preparation SiO/polyimide nanocomposite. Sol/polyimide compatibility is determined using a polyamic acid solution (4 wt %) that is prepared by diluting poly (3,3',4,4'-benzophenonetetracarboxylic dianhydride-co-4,4'-oxydianiline/1,3-phenylenediamine), amic acid (19 wt. %, from Aldrich Chemical) with NMP. The dried sol powder prepared in Example 1 and heat-treated at 190° C./1 hr (0.0041 gm) is dissolved in NMP (0.07 gm). It is then treated with the above prepared polyamic acid solution (0.1 gm) and aminophenyltrimethoxysilane (0.001 gm) at RT/48 hrs to give a clear yellow solution. The solution (0.025 mg) is cast on a glass plate and cured at 80° C./30 min+150° C./2 hrs+240° C./30 min+280° C./30 min+320° C./1 hr to give a clear brownish yellow film with no cracks. The sol/polyamic acid solution is kept in a refrigerator for two weeks. The solution maintains its low viscosity and no gelation is observed. The aged solution is again cured under the same condition to give a clear film with no cracks.

EXAMPLE 18

Example 18 involves the preparation SiO/polyamideimide nanocomposite. Polyamideimide precursor solution (18%) is prepared by diluting poly (trimellitic anhydride chloride-co-4,4'-methylenedianiline) powder (purchased from Aldrich Chemical) with NMP. The dried sol powder prepared in Example 1 and heat-treated at 190° C./1 hr (0.0065 gm) is dissolved in NMP (0.07 gm) and treated with the above prepared polyamideimide precursor solution (0.15 gm) and aminophenyltrimethoxysilane (0.0012 gm) at RT/48 hrs. The clear solution (0.025 gm) is cast on a glass plate and cured at 60° C./20 min+150° C./1 hr+250° C./30 min+280° C./1 hr to give a clear brownish film with no cracks. The sol/precursor solution is kept in a refrigerator for two weeks. The solution maintains its low viscosity and no gelation is observed. The aged solution is again cured under the same condition to give a clear film with no cracks.

EXAMPLE 19

Example 19 involves the preparation SiO/acrylate nanocomposite. The dried sol powder prepared in Example 1 and heat treated at 190° C./1 hr (0.032 gm) is combined with 2-hydroxyethylmethacryalte (0.06 gm), $CN_{104}D80$ epoxy acrylate from Sartomer (0.091 gm), Z6030 silane from Dow Corning (0.002 gm) and methoxyethanol (0.03 gm) and stirred until a clear solution is obtained. After addition of dimethoxyphenylacetophenone photoinitiator (0.0015 gm), the resulting clear solution (0.030 gm) is poured onto a glass plate, removed the volatiles under $N_2$ flow at 50° C., and cured by exposing to a UV lamp. The cured film is optically transparent.

EXAMPLE 20

Example 20 involves the preparation Au/SiO/acryalte nanocomposite. The sol/acrylate solution prepared in Example 19 (0.15 gm) is combined with the Au/sol nanocomposite powder prepared in Example 19 (0.015 gm) and stirred at RT/overnight to give a clear wine red solution. Portion of the solution is cast on a glass plate and UV cured under $N_2$ to give a clear wine-red film.

EXAMPLE 21

Example 21 involves the preparation SiO/polyurethane nanocomposite. A solution containing the dried sol powder prepared in Example 8 (heat-treated at 200° C./1 hr, 0.03 gm) is first dissolved in methoxyethanol (0.1 gm) and admixed with glycerol propoxylate (MW=1500, 0.078 gm) and bisphenol A propoxylate/ethoxylate (0.95 gm). After removal of the volatiles, the resulting viscous liquid is diluted with anhydrous acetone (0.1 gm) and admixed with isophorone diisocyanate (0.1 gm) and dibutyltin dilaurate (0.005 gm). The resin mixture is poured onto a glass plate and, after removing the volatiles under $N_2$, cured in an oven at 50° C./30 min+80° C./30 min+120° C./1 hr to give a transparent film.

EXAMPLE 22

Example 22 involves the preparation SiO/silicone nanocomposite. A solution containing the dried sol powder prepared in Example 8 (heat-treated at 200° C./1 hr, 0.018 gm) is first dissolved in methoxyethanol (0.1 gm) and treated with diphenylsilanediol (0.039 gm) and aluminum di-s-butoxide ethylacetoacetate (0.002 gm) at RT/overnight. The solution is cast on a glass plate and, after removing the volatiles under $N_2$, heated to 150° C./3 hrs to give a colorless clear film with no cracks.

EXAMPLE 23

Example 23 involves the preparation Au/SiO/silicone nanocomposite.

A solution containing the dried sol powder prepared in Example 16 (heat-treated at 200° C./1 hr, 0.015 gm) is first dissolved in methoxyethanol (0.1 gm) and treated with diphenylsilanediol (0.024 gm) and aluminum di-s-butoxide ethylacetoacetate (0.002 gm) at RT/overnight. The solution is cast on a glass plate and, after removing the volatiles under $N_2$, heated to 150° C./3 hrs to give a clear wine-red film with no cracks.

EXAMPLE 24

Example 24 involves the preparation SiO/epoxy nanocomposite. The dried sol prepared in Example 1 (200° C. heat-treated, 0.077 gm) is admixed with bisphenol A propoxylate/ethoxylate (0.125 gm), 2-(3,4-epoxycyclohexyl) ethyltrimethoxysilane (0.003 gm) and methoxyethanol (0.1 gm) to make a clear solution. After removing the volatiles in vacuo, the clear viscous liquid is combined with UVR-6105 epoxy resin from Dow Chemical (0.1 gm). The resin mixture (0.05 gm) is then combined with aluminum di-s-butoxide ethylacetoacetate (0.002 gm) and anhydrous acetone (0.05 gm). The resulting solution is cast on a glass plate and cured at 50° C./30 min+150° C./3 hrs to give a clear film.

EXAMPLE 25

Example 25 involves the preparation CdS/SiO/epoxy nanocomposite. The CdS/silica sol powder prepared in Example 11 (0.013 gm) is first dissolved in methoxyethanol (0.1 gm) and combined with the resin mixture prepared in Example 24 (0.1 gm). After removing the volatiles, the resulting clear solution is then combined with aluminum di-s-butoxide ethylacetoacetate (0.003 gm) and anhydrous acetone (0.05 gm). The resulting solution is cast on a glass plate and cured at 50° C./30 min+150° C./3 hrs to give a clear yellowish film that emits a bright orange color under UV exposure.

EXAMPLE 26

Example 26 involves the preparation of silica sols using an acid and base catalyst (removal of the liquid after addition of a base catalyst). TEOS (0.097 gm, 0.47 mmol) is combined with 2-propanol (0.5 gm) and stirred at RT/overnight after addition of acetic acid (0.005 gm, 0.08 mmol) and DI water (0.067 gm, 3.7 mmol). Addition of phenyltrimethoxysilane (0.087 gm, 0.44 mmol) followed by stirring at RT/overnight and 80° C./5 hrs gives a clear solution. The solution is then admixed with 7.5% $NET_4OH$ in methanol (10 mg) and further stirred at 80° C./2 hrs. Removal of the volatiles in vacuo followed by heat treatment at 130° C./1 hr gives colorless residues (0.082 gm). The dried intermediate sol (0.025 gm) is mixed with methoxyethanol (0.5 gm) and heated to 120° C./5 hrs to give a clear solution. Removal of the volatiles followed by heat-treatment at 180° C./1 hr provides colorless residues which give a clear solution when admixed with methoxyethanol.

EXAMPLE 27

Example 27 describes the preparation of a mixed metal oxide sol (SiO—TiO).

A solution of TEOS (0.034 gm, 0.16 mmol) and phenyltrimethoxysilane (0.036 gm, 0.18 mmol) in methoxyethanol (0.5 gm) is prepared. It is stirred at RT/2 hrs after addition of titanium isopropoxide (0.023 gm, 0.08 mmol) and boric acid (0.008 gm, 0.13 mmol), and then further stirred at RT/overnight and 120° C./3 hrs after addition of DI water (0.03 gm, 1.7 mmol). The resulting clear solution is vacuum dried and heat treated at 190° C. in an oven to give colorless residues (0.047 gm) which are readily soluble in methoxyethanol (0.6 gm) to give a clear solution.

EXAMPLE 28

Example 28 describes the preparation of silica sol containing titanium phosphate. A solution of TEOS (0.034 gm, 0.16 mmol) and phenyltrimethoxysilane (0.036 gm, 0.18 mmol) in methoxyethanol (0.5 gm) is prepared. It is stirred at RT/2 hrs after addition of titanium isopropoxide (0.023 gm, 0.08 mmol), triethylphosphate (0.03 gm, 0.16 mmol) and boric acid (0.008 gm, 0.13 mmol). It is further stirred at RT/overnight and 120° C./3 hrs in the presence of DI water 0.03 gm, 1.7 mmol). The resulting clear solution is vacuum dried and heat treated at 190° C. in an oven to give colorless residues (0.055 gm) which are readily soluble in methoxyethanol (0.6 gm) to give a clear solution.

EXAMPLE 29

Example 29 describes the preparation of a silica sol containing titanium phosphate sol. A homogeneous solution of titanium isopropoxide (0.108 gm, 0.38 mmol), phenyltrimethocxysilane (0.099 gm, 0.5 mmol), and ethylphosphate (0.138 gm, 0.76 mmol) in methoxyethanol (0.5 ml) is prepared in a vial. After addition of a solution of boric acid (0.031 gm, 0.5 mmol) in methoxyethanol (0.2 ml), the resulting solution is stirred at RT/overnight and 100° C./2 hrs. DI water (0.05 gm, 2.8 mmol) is added and stirring is continued at 100° C./2 hrs and 120° C./2 hrs. The solution remains clear throughout the procedure. The volatiles are removed in vacuo and the residues are heated in an oven at 130° C./2 hrs to give a slightly yellowish solid (0.16 gm). The dried sol powder (0.013 gm) in a vial is heated to 180° C./2 hrs. It is then dissolved in methoxyethanol (0.3 ml) to give a clear solution. The sol solution is then admixed with a solution containing TEOS (0.052 gm, 0.25 mmol), phenyltrimethoxysilane (0.052 gm, 0.26 mmol) and boric acid (0.015 gm, 0.24 mmol) in 2-propanol (0.6 gm). After addition of 2% HCl (0.02 gm), the resulting solution is stirred at RT/overnight and 80° C./5 hr to give a clear solution. Removal of the volatiles followed by heat-treatment at 180° C./1 hr provides colorless residues (0.057 gm) which is readily soluble in methoxyethanol (0.7 gm) to give a clear solution.

EXAMPLE 30

Example 30 describes the preparation of a silica sol containing Au nanoparticles hosted by aluminum oxide sol. The Au nanoparticles hosted by Aluminum oxide sol are prepared by treating a solution containing aluminum s-butoxide (0.286 gm, 1.16 mmol), phenyltrimethxoxysilane (0.23 gm, 1.16 mmol), 3-mercaptopropyltrimethoxysilane (0.011 gm, 0.056 mmol) and methoxyethanol (1.0 gm) with $Au(OH)_3$ at RT/overnight, with boric acid (0.072 gm, 1.16 mmol) and DI water (0.03 gm, 1.7 mmol) at RT/overnight, and then exposing to sunlight to gradually generate a clear wine-red solution. The sol solution (0.06 gm) that is aged at RT for 18 months in a vial is then admixed with a solution containing the silica sol powder prepared in Example 9 (heat-treated at 135° C., 0.030 gm) in methoxyethanol (0.5 gm) and stirred at RT/4 hrs and 100° C./6 hrs to give a clear wine-red solution. Removal of the volatiles followed by heat-treatment at 150° C./1 hr to give wine red residues (0.035 gm) which provides a clear wine-red solution when mixed with methoxyethanol (0.5 gm). The sol provides a clear wine-red film when cast on a glass plate under nitrogen.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of making a silica sol comprising combining:
from about 10% to about 80% by weight of at least one hydrolysable silane,
from about 10% to about 60% by weight of at least one organofunctional silane,
from about 0.5% to about 80% by weight of at least one boron oxide compound and an optional catalyst, or effective amounts of at least two catalysts to provide the silica sol and an optional boron oxide compound, and a liquid.

2. The method of claim 1, wherein the method comprises:
combining at least one hydrolysable silane, at least one organofunctional silane, at least one acid catalyst, and a liquid to provide an intermediate sol, and
combining at least one base catalyst with the intermediate sol.

3. The method of claim 1, wherein the hydrolysable silane comprises a compound represented by Formula I:

$$Si(R^1)_4 \quad (I)$$

wherein each $R^1$ is individually at least one hydrolysable group selected from the group consisting of a ketoxime group, an alkoxy group, an alkenoxy group, an acyloxy group, an acetoxy group, a halo group, and an amino group;
the organofunctional silane comprises a compound represented by Formula II:

$$(R^2)_{4-c}Si(X^2)_c \quad (II)$$

wherein c is 1 to 3, each $X^2$ is individually a hydrogen, halogen, carboxylate, amino or an alkoxy group containing from 1 to about 4 carbon atoms, and each $R^2$ is individually an organofunctional containing organic group containing from about 1 to about 24 carbon atoms including at least one from the group consisting of heterocyclic, acryloxy, cyano, phosphino, amino, amide, vinyl, epoxy, glycidoxy, aryl, alkyl, a carbon carbon triple bond containing group, mercapto, siloxy, halocarbon, and a carbon carbon double bond containing group; and
the boron oxide compound comprises a compound represented by Formula III:

$$B(OH)_d(OR)_{3-d} \quad (III)$$

wherein each R is independently a hydrocarbyl group containing from 1 to about 8 carbon atoms, and d is from 0 to about 3, or the boron oxide compound comprises a compound represented by Formula IV:

$$B(OH)_e(OR)_f(R^3)_{3-(e+f)} \quad (IV)$$

wherein each R is independently a hydrocarbyl group containing from 1 to about 8 carbon atoms, each $R^3$ is independently a hydrocarbyl group containing from 1 to about 24 carbon atoms, e is from 0 to about 3, and f is from 0 to about 3.

4. The method of claim 1, wherein the boron oxide compound is selected from the group consisting of boric acid, alkoxy boron compounds, hydrocarbyl boric acids, hydrocarbyl hydroxy boron alkoxides, and hydroxy boron alkoxides.

5. The method of claim 1, wherein the liquid is an organic solvent or water and an organic solvent.

6. The method of claim 1 further comprises removing the liquid phase of the silica sol to provide a dried silica sol, the dried silica sol comprising less than about 0.5% by weight of water.

7. A method of making a nanocomposite comprising combining:
from about 10% to about 80% by weight of at least one hydrolysable silane,
from about 10% to about 60% by weight of at least one organofunctional silane,
from about 0.5% to about 80% by weight of at least one boron oxide compound and an optional catalyst, or effective amounts of at least two catalysts to provide a host silica sol and an optional boron oxide compound, a liquid; and
from about 0.001% to about 80% by weight of at least one of guest metal nanoparticle, guest metal-chalcogenide nanoparticle, metal phosphate nanoparticle, guest metal oxide nanoparticle, and precursors of these guest nanoparticles.

8. The method of claim 7, wherein the hydrolysable silane comprises a compound represented by Formula I:

$$Si(R^1)_4 \quad (I)$$

wherein each $R^1$ is individually at least one hydrolysable group selected from the group consisting of a ketoxime group, an alkoxy group, an alkenoxy group, an acyloxy group, an acetoxy group, a halo group, and an amino group;
the organofunctional silane comprises a compound represented by Formula II:

$$(R^2)_{4-c}Si(X^2)_c \quad (II)$$

wherein c is 1 to 3, each $X^2$ is individually a hydrogen, halogen, carboxylate, amino or an alkoxy group containing from 1 to about 4 carbon atoms, and each $R^2$ is individually an organofunctional containing organic group containing from about 1 to about 24 carbon atoms including at least one from the group consisting of heterocyclic, acryloxy, cyano, phosphino, amino, amide, vinyl, epoxy, glycidoxy, aryl, alkyl, a carbon carbon triple bond containing group, mercapto, siloxy, halocarbon, and a carbon carbon double bond containing group; and
the boron oxide compound comprises a compound represented by Formula III:

$$B(OH)_d(OR)_{3-d} \quad (III)$$

wherein each R is independently a hydrocarbyl group containing from 1 to about 8 carbon atoms, and d is from 0 to about 3, or the boron oxide compound comprises a compound represented by Formula IV:

$$B(OH)_e(OR)_f(R^3)_{3-(e+f)} \quad (IV)$$

wherein each R is independently a hydrocarbyl group containing from 1 to about 8 carbon atoms, each $R^3$ is independently a hydrocarbyl group containing from 1 to about 24 carbon atoms, e is from 0 to about 3, and f is from 0 to about 3.

9. The method of claim 7, wherein the guest nanoparticle precursor comprises at least one selected from the group consisting of zero-valent metal, metal oxides, metal carboxylates, metal hydroxides, metal nitrates, metal halides, metal cyanides, metal alkoxides and chelated metals.

10. The method of claim 7, wherein the guest metal nanoparticle, guest metal-chalcogenide nanoparticle, metal phosphate nanoparticle, guest metal oxide nanoparticle, and precursors of these guest nanoparticles comprise at least one metal atom selected from the group consisting of aluminum, antimony, arsenic, barium, beryllium, bismuth, cadmium, calcium, cerium, chromium, cobalt, copper, dysprosium, erbium, europium, gadolinium, gallium, gold, hafnium, holmium, indium, iridium, iron, lanthanum, lead, lithium, lutetium, magnesium, manganese, mercury, molybdenum, neodymium, nickel, niobium, osmium, palladium, platinum, potassium, praseodymium, rhenium, rhodium, rubidium, ruthenium, samarium, scandium, silver, strontium, tantalum, technetium, terbium, titanium, thallium, thorium, thulium, tin, tungsten, uranium, vanadium, ytterbium, yttrium, zinc, and zirconium.

11. The method of claim 7 further comprises removing the liquid phase of the nanocomposite to provide a dried nanocomposite, the dried nanocomposite comprising less than about 0.5% by weight of water.

12. The method of claim 7, wherein the method comprises one of;
combining at least one of guest metal nanoparticle, guest metal-chalcogenide nanoparticle, metal phosphate nanoparticle, guest metal oxide nanoparticle, and precursors of these guest nanoparticles; at least one hydrolysable silane; at least one organofunctional silane; at least one boron oxide compound; an optional catalyst; and a liquid to provide the nanocomposite;
combining at least one of guest metal nanoparticle, guest metal-chalcogenide nanoparticle, metal phosphate nanoparticle, guest metal oxide nanoparticle, and precursors of these guest nanoparticles, at least one hydrolysable silane, at least one organofunctional silane, at least one acid catalyst, an optional boron oxide compound, and a liquid to provide an intermediate sol, and combining at least one base catalyst and an optional boron oxide compound with the intermediate sol to provide the nanocomposite; or
combining at least one hydrolysable silane, at least one organofunctional silane, at least one acid catalyst, an optional boron oxide compound, and a liquid to provide an intermediate sol and combining at least one of guest metal nanoparticle, guest metal-chalcogenide nanoparticle, metal phosphate nanoparticle, guest metal oxide nanoparticle, and precursors of these guest nanoparticles, at least one base catalyst, and an optional boron oxide compound with the intermediate sol to provide the nanocomposite.

13. The method of claim 7 further comprises chalcogenizing the host guest silica sols comprising the silica sol and at least one of the guest metal-chalcogenide precursors, metal nanoparticles, and metal oxide nanoparticles to provide a nanocomposite comprising the host silica sol and guest metal-chalcogenide nanoparticles.

14. The method of claim 7 further comprises oxidizing the host guest silica sols comprising the silica sol and at least one of the guest metal oxide precursors and metal nanoparticles to provide a nanocomposite comprising the host silica sol and guest metal oxide nanoparticles.

15. The method of claim 7 further comprises phosphatizing the host guest silica sols comprising the silica sol and at least one of the guest metal phosphate precursors, metal nanoparticles, and metal oxide nanoparticles to provide a nanocomposite comprising the host silica sol and guest metal phosphate nanoparticles.

16. The method of claim 7, wherein the guest metal oxide nanoparticles comprise metal oxide sols.

17. The method of claim 7, wherein the guest metal phosphate nanoparticles comprise metal phosphate sols.

18. A polymer composite comprising:
from about 1% to about 99.99% by weight of a polymer material;
from about 0.01% to about 99% by weight of a silica sol and/or a nanocomposite comprising at least one of metal nanoparticle, metal-chalcogenide nanoparticle, metal phosphate nanoparticle and metal oxide nanoparticle substantially uniformly dispersed within the polymer material;
wherein the silica sol is at least one of a silica sol made by combining from about 10% to about 80% by weight of at least one hydrolysable silane; from about 10% to about 60% by weight of at least one organofunctional silane; from about 0.5% to about 80% by weight of at least one boron oxide compound; an optional catalyst; and a liquid; or a silica sol made by combining from about 10% to about 80% by weight of at least one hydrolysable silane, from about 10% to about 60% by weight of at least one organofunctional silane, at least one acid catalyst, and a liquid to provide an intermediate sol and combining at least one base catalyst with the intermediate sol to provide the silica sol; and
wherein the nanocomposite is at least one of a nanocomposite comprising from about 0.001% to about 80% by weight of at least one of guest metal nanoparticle, guest metal-chalcogenide nanoparticle, metal phosphate nanoparticle and metal oxide nanoparticle, and from about 20% to about 99.999% by weight of the host silica sol; a nanocomposite made by chalcogenizing a host-guest silica sol comprising from about 0.001% to about 80% by weight of at least one of guest metal-chalcogenide precursors, guest metal nanoparticles, and guest metal oxide nanoparticles and from about 20% to about 99.999% by weight of the host silica sol; a nanocomposite made by phosphatizing a host-guest silica sol comprising from about 0.001% to about 80% by weight of at least one of guest metal phosphate precursors, guest metal nanoparticles, and guest metal oxide nanoparticles and from about 20% to about 99.999% by weight of the host silica sol; or a nanocomposite made by oxidizing a host-guest silica sol comprising from about 0.001% to about 80% by weight of at least one of guest metal oxide precursors and guest metal nanoparticle and from about 20% to about 99.999% by weight of the host silica sol.

19. The polymer composite of claim 18, wherein the polymer material comprises at least one selected from the group consisting of a polyacrylate, an unsaturated polyester, a saturated polyester, a polyolefin, an alkyd resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybemzoxazoles, polybenzthiazoles, polyfluorocarbones, polyphenylene ethers, polyarylates, cyanate ester polymers, and copolymers of two or more thereof.

20. The polymer composition of claim 18, wherein the metal nanoparticle, metal-chalcogenide nanoparticle, metal phosphate nanoparticle and metal oxide nanoparticle comprise at least one metal atom selected from the group consisting of aluminum, antimony, arsenic, barium, beryllium, bismuth, cadmium, calcium, cerium, chromium, cobalt, copper, dysprosium, erbium, europium, gadolinium, gallium, gold, hafnium, holmium, indium, iridium, iron, lanthanum, lead, lithium, lutetium, magnesium, manganese, mercury, molybdenum, neodymium, nickel, niobium, osmium, palladium, platinum, potassium, praseodymium, rhenium, rhodium, rubidium, ruthenium, samarium, scandium, silver, strontium, tantalum, technetium, terbium, titanium, thallium, thorium, thulium, tin, tungsten, uranium, vanadium, ytterbium, yttrium, zinc, and zirconium.

* * * * *